US009418628B2

(12) United States Patent  
Brown

(10) Patent No.: US 9,418,628 B2  
(45) Date of Patent: Aug. 16, 2016

(54) DISPLAYING IMAGE DATA BASED ON PERSPECTIVE CENTER OF PRIMARY IMAGE

(71) Applicant: Trimble Navigation Limited, Sunnyvale, CA (US)

(72) Inventor: Troy Brown, Westminster, CO (US)

(73) Assignee: Trimble Navigation Limited, Sunnyvale, CA (US)

( * ) Notice: Subject to any disclaimer, the term of this patent is extended or adjusted under 35 U.S.C. 154(b) by 289 days.

(21) Appl. No.: 13/796,260

(22) Filed: Mar. 12, 2013

(65) Prior Publication Data

US 2013/0271490 A1 Oct. 17, 2013

Related U.S. Application Data

(60) Provisional application No. 61/624,296, filed on Apr. 15, 2012.

(51) Int. Cl.
| | | |
|---|---|---|
| *G09G 5/377* | (2006.01) | |
| *G06T 7/00* | (2006.01) | |
| *H04N 5/232* | (2006.01) | |
| *H04N 5/262* | (2006.01) | |
| *G01C 15/00* | (2006.01) | |

(Continued)

(52) U.S. Cl.
CPC ............... *G09G 5/377* (2013.01); *G01C 15/00* (2013.01); *G03B 37/04* (2013.01); *G06T 3/4038* (2013.01); *G06T 7/0022* (2013.01); *H04N 5/23238* (2013.01); *H04N 5/2628* (2013.01); *G09G 2340/12* (2013.01)

(58) Field of Classification Search
CPC .......... G09G 2340/10; G09G 2340/12; G09G 2300/02
See application file for complete search history.

(56) References Cited

U.S. PATENT DOCUMENTS 5,495,576 A 2/1996 Ritchey et al.  
6,141,034 A 10/2000 McCutchen (Continued)

FOREIGN PATENT DOCUMENTS

CN 101911113 A 12/2010  
EP 1 909 226 A2 4/2008

OTHER PUBLICATIONS

Frome et al., Large-scale Privacy Protection in Google Street View, Oct. 2009, IEEE International Conference on Computer Vision (2009), pp. 1-8.*

(Continued)

*Primary Examiner* — Matthew Salvucci  
(74) *Attorney, Agent, or Firm* — Kilpatrick Townsend & Stockton LLP

(57) ABSTRACT

A method for displaying image data from a plurality of images on a display monitor, where at least some of the images are acquired from different locations, includes displaying the image data from the images on the display monitor. The image data may be displayed from a perspective center associated with the different locations from which the images are acquired. A primary image is determined based on a portion of the image data from the primary image that is displayed on the display monitor compared to portions of the image data from other images that are displayed on the display monitor. Thereafter, the image data on the display monitor is displayed from a perspective center of the primary image. A stacking order of the plurality of images is arranged so that the primary image is on top.

12 Claims, 15 Drawing Sheets

(51) Int. Cl.
*G03B 37/04* (2006.01)
*G06T 3/40* (2006.01)

(56) References Cited

U.S. PATENT DOCUMENTS

| | | |
|---|---|---|
| 6,327,381 B1 | 12/2001 | Rogina et al. |
| 6,389,179 B1 | 5/2002 | Katayama et al. |
| 6,628,283 B1 * | 9/2003 | Gardner .................. 345/427 |
| 6,950,109 B2 | 9/2005 | Deering |
| 7,109,988 B2 * | 9/2006 | Shum et al. ............. 345/423 |
| 7,414,658 B2 | 8/2008 | Ariga |
| 7,536,053 B2 | 5/2009 | Davidson-Sokal et al. |
| 7,751,645 B2 | 7/2010 | Reneker et al. |
| 8,045,040 B2 | 10/2011 | Jerdev et al. |
| 2006/0152589 A1 | 7/2006 | Morrison et al. |
| 2007/0211955 A1 | 9/2007 | Pan et al. |
| 2010/0157043 A1 | 6/2010 | Demers et al. |
| 2010/0214433 A1 | 8/2010 | Takahashi |
| 2011/0285748 A1 * | 11/2011 | Slatter et al. ............. 345/629 |
| 2012/0163656 A1 | 6/2012 | Wang et al. |
| 2012/0166137 A1 | 6/2012 | Grasser et al. |
| 2012/0330601 A1 | 12/2012 | Soubra et al. |

OTHER PUBLICATIONS

International Search Report and Written Opinion for PCT Application No. PCT/US13/35568, mailed Jul. 30, 2013, 11 pages.
Kawanishi, T., et al., "Generation of High-resolution Stereo Panoramic Images by Omnidirectional Imaging Sensor Using Hexagonal Pyramidal Mirrors," Graduate School of Information Science, Nara Institute of Science and Technology; Proceedings of the Fourteenth International Conference on Brisbane, 1998, pp. 485-489.
First Office Action for Chinese Patent Application No. 201380031641.7, issued on Nov. 30, 2015, 8 pages.
Extended European Search Report for Application No. EP 13 77 8017, dated Feb. 22, 2016, 17 pages.
Communication pursuant to Rules 70(2) and 70a(2) for Application No. EP 13 77 8017 dated Mar. 10, 2016, 1 page.

* cited by examiner

DISPLAYING IMAGE DATA BASED ON PERSPECTIVE CENTER OF PRIMARY IMAGE

CROSS-REFERENCE TO RELATED APPLICATIONS

This application claims priority to U.S. Provisional Patent Application No. 61/624,296, filed Apr. 15, 2012, the entire contents of which are incorporated herein by reference in their entirety for all purposes.

FIELD OF THE INVENTION

The present disclosure relates in general to image display improvements, and more particularly, to improved methods for displaying image data and locating points of interest in images.

BACKGROUND

Traditional surveying may involve operators working with a theodolite and range pole. One operator generally positions the theodolite over a known point while the other operator holds the range pole at a series of points whose locations are to be determined. A target mounted on the range pole is sighted through the theodolite and accurate angular measurements are obtained. Accurate distance measurements may also be obtained using a measuring tape or any other distance measuring device. The locations of the points can be determined using the angular and distance measurements in accordance with known triangulation techniques.

In modern satellite based surveying, an operator may move about with a survey instrument that determines position information using a global navigation satellite system (GNSS). The satellite positioning system most commonly used today is the global positioning system (GPS), although others such as the global orbiting navigation system (GLONASS) are in use or under development. The operator generally moves about a site and stops at various points to record location information determined using signals transmitted by satellite sources. Correction data may be transmitted from a reference site using a telemetry system.

Cameras are often used with modern survey instruments to associate location information with image information. The combined information can be used with known photogrammetry techniques to determine three-dimensional coordinates of points. Such techniques often use two or more overlapping or adjacent images taken from different stations (e.g., different locations). Cameras can be arranged to obtain images that provide a continuous view of a scene. Many survey instruments, for example, have one or more cameras configured to obtain one or more images that provide up to a full 360° view.

The location and image information can be processed at a site using a controller or may be processed at an office remote from the site using a computer system. The image information allows for additional measurements to be obtained at any time as long as the additional points or objects are visible in the images.

As the use of location and image information becomes more widespread, techniques to utilize and view the information become increasing important. Thus, improved methods for displaying image data and locating points of interest in images are continuously desired.

SUMMARY

Embodiments of the present invention provide improved methods for displaying image data and locating points of interest in displayed images. For example, in accordance with an embodiment of the present invention, a method for displaying arrays of digital image data on a display monitor as a continuous image, where each array forms a two-dimensional image of a different portion of a scene captured by an imaging device, and where shapes of surfaces and objects in the scene are unknown and at least some of the arrays of digital image data are captured from locations that are different from a location of a perspective center from which the arrays of digital image data are displayed, comprises determining nonlinear corrections for each of the arrays of digital image data. Each nonlinear correction may be based in part on a location of the imaging device used to capture the array of digital image data relative to a location of the perspective center from which the array of digital image data will be displayed on the display monitor. The method also includes transforming each array of digital image data using the corresponding nonlinear correction, where for each array of digital image data, the corresponding nonlinear correction modifies pixels in one portion of the array of digital image data differently than pixels in another portion of the array of digital image data to produce arrays of corrected image data. The method also includes displaying the arrays of corrected image data on the display monitor to produce a continuous display of the scene captured by the imaging device, where relative sizes and positions of objects in the scene are substantially reproduced in the display of the scene.

In an embodiment, at least a portion of each two-dimensional image and a corresponding portion of the scene overlap with another two-dimensional image and a corresponding portion of the scene, and pixels in different arrays of corrected image data that capture substantially similar light rays from the scene are substantially overlying each other in the continuous display of the scene.

In another embodiment, adjacent portions of the scene are captured by different arrays of digital image data to form adjacent two-dimensional images of the scene, and pixels in adjacent two-dimensional images that capture substantially adjacent light rays from the scene are substantially adjacent each other in the continuous display of the scene.

In another embodiment, the imaging device comprises a plurality of imaging devices each capturing one of the arrays of digital image data, each of the imaging devices having a fixed position and orientation relative to the other imaging devices.

In another embodiment, the imaging device comprises a plurality of imaging devices each capturing one of the arrays of digital image data, the plurality of imaging devices coupled to a survey instrument and arranged such that a field of view of each imaging device overlaps with fields of view of other imaging devices to provide a 360° field of view of the scene surrounding the plurality of imaging devices.

In another embodiment, the imaging device comprises a digital camera configured to rotate about a support mechanism to provide the arrays of digital image data, each array of digital image data having a fixed positional relationship with adjacent arrays of digital image data.

the arrays of digital image data form overlapping two-dimensional images of the scene to provide a 360° panoramic view of the scene.

each nonlinear correction is based in part on a distance between a lens of the imaging device used to capture the array of digital image data and a concave-shaped surface.

each nonlinear correction is based in part on a distance between a lens of the imaging device used to capture the array of digital image data and a flat portion of a surface having a plurality of flat portions arranged in a concave shape.

In another embodiment, the imaging device comprises a plurality of digital cameras.

In another embodiment, each of the nonlinear corrections change a relative size of the pixels across the corresponding array of digital image data.

In yet another embodiment, the method also includes providing coordinates of a point in the scene, the coordinates provided in a reference frame associated with the imaging device, and superimposing a computer-rendered graphic on the display of the scene at projected coordinates of the point such that the computer-rendered graphic overlies the point in the display of the scene.

In accordance with another embodiment of the present invention, a method for displaying image data from a plurality of images on a display monitor, where at least some of the plurality of images are acquired from different locations, includes displaying the image data from the plurality of images on the display monitor. The image data from the plurality of images may be displayed from a perspective center associated with the different locations from which the plurality of images are acquired. The method also includes determining a primary image of the plurality of images. The primary image may be determined based on a portion of the image data from the primary image that is displayed on the display monitor compared to portions of the image data from other images that are displayed on the display monitor. The method also includes displaying the image data from the plurality of images on the display monitor. The image data from the plurality of images may be displayed from a perspective center of the primary image. The method also includes arranging a stacking order of the plurality of images so that the primary image is on top.

In some embodiments, the plurality of images capture overlapping portions of a scene. In other embodiments, the plurality of images capture adjacent portions of a scene.

In another embodiment, the perspective center associated with the different positions from which the plurality of images are acquired is located substantially at an average position of the different positions.

In another embodiment, the primary image is also determined based on a position of the primary image on the display monitor relative to positions of the other images displayed on the display monitor.

In yet another embodiment, the method also includes forming a line around the primary image as an indication of the primary image.

In accordance with another embodiment of the present invention, a method for identifying one or more pixels of image data associated with a point in an image using a display monitor displaying the image includes receiving an indication of a portion of the image as displayed on the display monitor that surrounds the point, and identifying pixels of image data as displayed on the display monitor that are located approximately at edges of the portion of the image. The method also includes performing one or more inverse transformations to transform the pixels of image data as displayed on the display monitor to pixels of image data as captured by an image sensor, and identifying a portion of image data as captured by the image sensor that corresponds to a portion of the image that surrounds the point, the portion of the image data identified based on the pixels of image data as captured by the image sensor. The method also includes displaying the portion of the image data as captured by the image sensor on the display monitor without data transformation, and receiving an indication of the one or more pixels of image data associated with the point in the image.

In an embodiment, the portion of the image on the display monitor that surrounds the point is polygon shaped, and the pixels of the display monitor that are located approximately at the edges of the portion of the image are located approximately at corners of the polygon.

In another embodiment, the method also includes magnifying the portion of the image data as captured by the image sensor. Displaying the portion of the image data as captured by the image sensor may comprise displaying the magnified portion of the image data.

In accordance with yet another embodiment of the present invention, a method for locating a point of interest in a plurality of images includes identifying the point of interest in a first view of the scene. The point of interest may be identified by selecting a point on the display monitor that corresponds to the point of interest as displayed in the first view. The method also includes identifying pixels of image data that correspond to the selected point on the display monitor. The pixels of image data may be part of one or more arrays of image data that form the first view of the scene. The method also includes determining a line in each of the views. The line may extend along a ray that passes through the point of interest in the scene to pixels of an image sensor corresponding to the pixels of image data in the first view of the scene. The method also includes displaying the line in each of the views in which the line is visible, and providing a slidable indicator in each of the views that is movable along the line. The slidable indicator can be moved by user input, and any movement of the slidable indicator along the line may be visible in each of the other views and updates the scene displayed in each of the other views accordingly. The method also includes moving the slidable indicator along the line until the slidable indicator is proximate the point of interest in each of the other views.

In an embodiment, the first view of the scene comprises one or more images each displayed from a common perspective center.

In another embodiment, each of the views comprise more than one image, and for each view, the corresponding images are obtained from a different station and displayed on a window in the display monitor from a common perspective center.

In another embodiment, the different stations are at different locations within the scene.

In another embodiment, the point of interest is identified in the first view by selecting a point on a display monitor using an input device In another embodiment, the slidable indicator is a slide bar.

In another embodiment, as the slidable indicator is moved, the view in each of the other views is oriented to provide a side view of the slidable indicator moving along the line.

In another embodiment, a length of the line is determined based at least in part on a distance between the different stations from which each of the views are obtained, and as the slidable indicator is moved along the line, a distance from the image sensor to the slidable indicator is determined.

In yet another embodiment, a zoom level of each of the other windows is adjusted as the slidable indicator is moved along the line.

Numerous benefits are provided by embodiments of the present invention over conventional techniques. In some embodiments, for example, image data captured from different locations can be displayed on a display monitor (e.g., a controller screen, computer monitor, or the like) so that it closely resembles a real-world scene it represents. This means that the displayed image data has a high metric value (or that relative sizes and positions of objects in the scene are substantially reproduced). This can be done without knowledge of the shapes of surfaces and objects in the real-world scene. This allows the image data to be used for accurate survey and photogrammetry measurements. This also ensures that the image data will closely align with positions of corresponding points or objects that are superimposed onto the image data. For example, positions of several objects around a site may be measured using conventional surveying techniques. Images of the site may also be obtained. When viewing the image data on a display monitor, it may be useful to superimpose graphics (e.g., points, signs, coordinates, or the like) over the image data to identify the measured objects. The displayed image data corresponding to the objects will align with the superimposed graphics if the image data has a high metric value or is displayed in accordance with embodiments of the invention.

In other embodiments, points of interest in displayed images can be quickly located and accurately identified. For example, in an embodiment a reference graphic that passes through a point of interest may be superimposed over a displayed image captured from a first station. The reference graphic may also be superimposed over other displayed images captured from other stations. The reference graphic can be followed to the point of interest in the other displayed images to quickly locate the point of interest in those images. In another embodiment, pixels of image data without transformation can be used to select a point of interest in a displayed image. This allows a location of the point to be accurately determined.

Depending on the embodiment, one or more of the benefits may exist. These and other benefits are described throughout the specification.

DETAILED DESCRIPTION

Embodiments of the present invention provide improved methods for displaying image data and locating points of interest in displayed images. Some embodiments enable image data captured from different locations to be displayed on a monitor so that it closely resembles a real-world scene it represents. This can be done using a nonlinear correction that is based on a location of an imaging device used to capture an array of image data relative to a location of a perspective center from which the array of image data will be displayed. The nonlinear correction can be determined without knowledge of the shapes of surfaces and objects in the real-world scene. Other embodiments allow the image information to be used more easily so that points or objects in images can be quickly located and accurately identified. In an embodiment, this can be done using a reference graphic that is superimposed over a displayed image and that passes through a point of interest. The reference graphic can be followed to the point of interest in other displayed images that are captured from different stations. In another embodiment, pixels of image data without transformation can be used to select a point of interest in a displayed image. These and other embodiments are described more fully below.

Figure 1A:
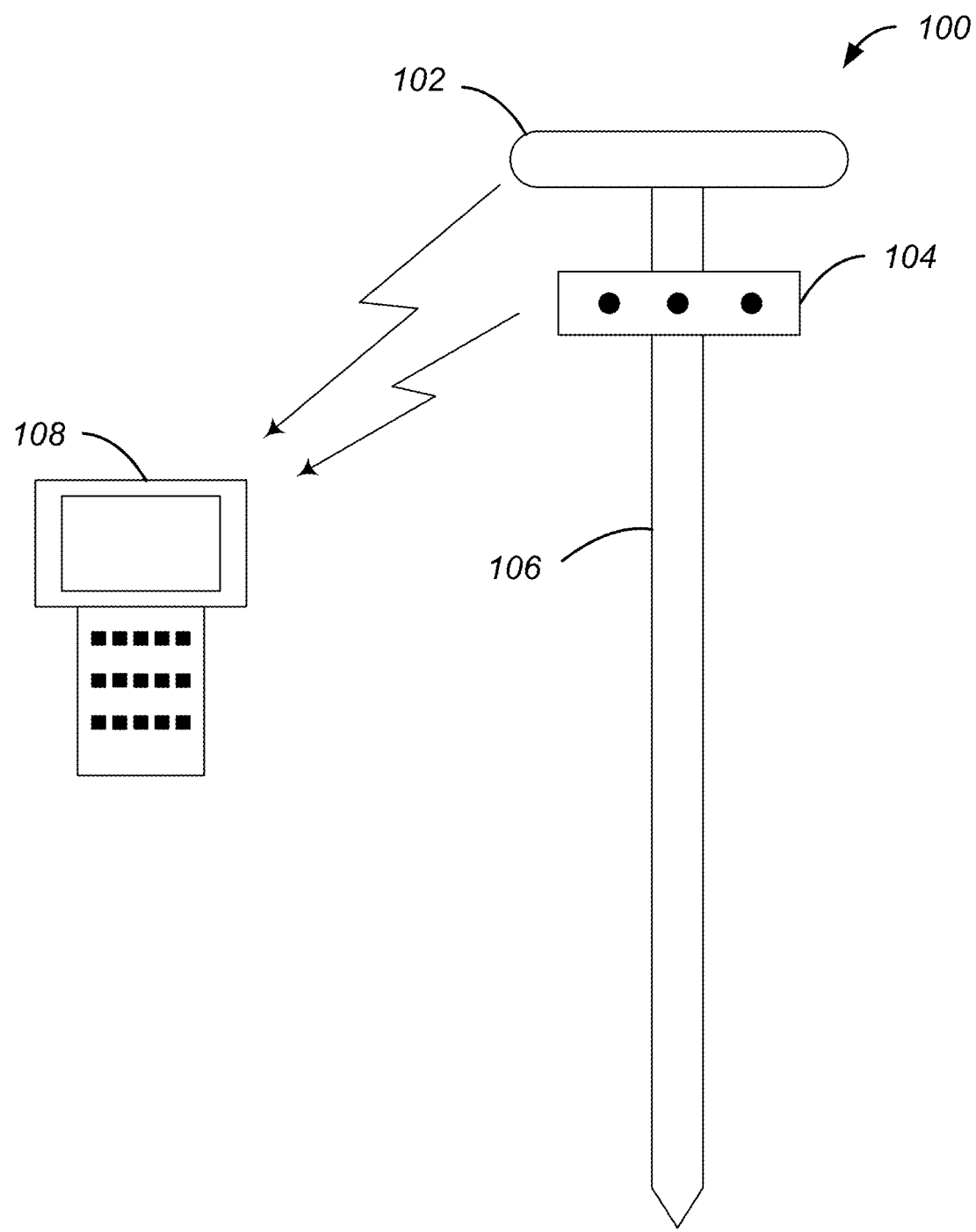
FIGS. 1A-1B are simplified diagrams of survey instruments that may be used in accordance with some embodiments of the invention.
Figure 1B:
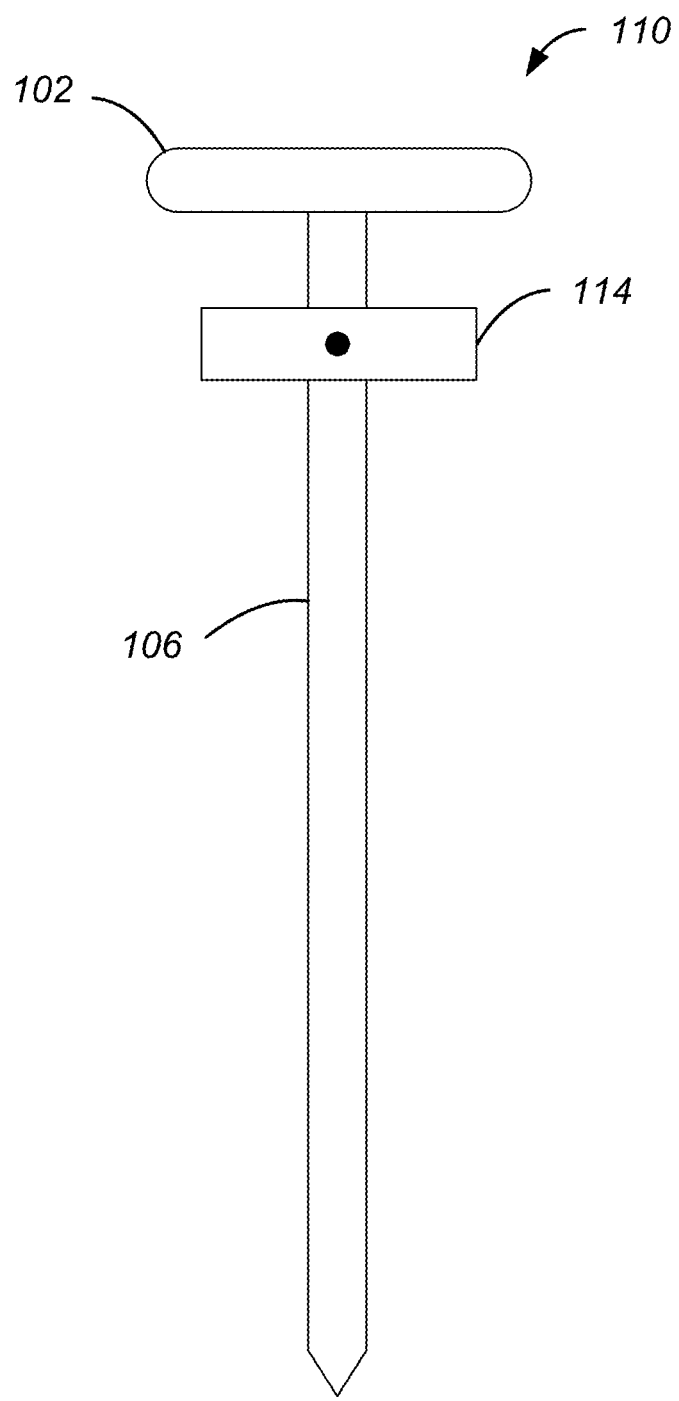

FIGS. 1A-1B are simplified diagrams of survey instruments that may be used in accordance with some embodiments of the invention. It should be appreciated that these survey instruments are provided merely as examples and other instruments having different configurations may similarly be used in accordance with the various embodiments.

FIG. 1A shows a survey instrument 100 that includes a GNSS receiver 102 and an imaging device 104 coupled to a support pole 106. The survey instrument 100 may also include other components such as one or more tilt sensors, distance measurement systems, or stabilizers. The support pole 106 has a longitudinal axis and may be designed so that a bottom tip of the support pole 106 can be accurately placed at a point of interest while measuring a position of the point of interest and/or capturing an image at the point of interest. The support pole 106 may be constructed of any suitable material such as wood, metal, plastic, composite, or the like and any combinations thereof. The support pole 106 may be monolighic or may comprise two or more separate sections that can be fixed or coupled together during manufacture or operation. The support pole 106 may include a compartment to store batteries that supply power to the GNSS receiver 102, the imaging device 104, and/or any other components that may be coupled to the support pole 106 in alternative configurations.

The GNSS receiver 102 may be permanently fixed to or removably coupled with the support pole 106. In certain embodiments, the GNSS receiver 102 may be affixed to a top end of the support pole 106 or otherwise disposed on or near a top portion of the support pole 106. The GNSS receiver 102 may include a receiver, an antenna, and/or other equipment necessary to receive signals and to determine position information. The GNSS receiver 102 may employ any of a variety of known satellite navigation techniques. For example, the GNSS receiver 102 may be configured to employ real-time kinematic (RTK) techniques in conjunction with reception of correction signals. The GNSS receiver 102 may also be used to determine orientation information. As used herein, the term "orientation" means any disposition of the survey instrument 100 relative to a reference (such as magnetic North or True North). As an example, the GNSS receiver 102 may be rotated in an arc, and multiple sets of location information obtained during rotation can be used to determine orientation of the GNSS receiver 102. Alternatively, the GNSS receiver 102 may include a compass and/or a compass or other orientation device may be separately coupled to the support pole 106.

The GNSS receiver 102 may also include a power supply (e.g., a rechargeable battery, and input from an external power source, or the like), non-transitory computer-readable storage media (e.g., magnetic storage, optical storage, solid-state storage, or the like), and a communication interface. The communication interface may comprise hardware and/or software necessary for communication with other components of the survey instrument 100 and/or external devices such as a controller 108. The communication interface may include a UHF radio, a cellular radio, a Bluetooth transceiver, a Wi-Fi transceiver, a wired communication interface, and/or the like.

The GNSS receiver 102 and the imaging device 104 may be configured to communicate with the controller 108. The controller 108 may include any device or combination of devices that function to control and/or receive input from components of the survey instrument 100. The controller 108 may include a communication interface similar to that of the GNSS receiver 102 described above. The communication interface of the controller 108 may be configured to support long-range communications (e.g., cellular or WWAN) even if the GNSS receiver 102 and imaging device 104 are not. Further, the communication interface of the controller 108 may be configured to allow communication with other devices to exchange information.

The controller 108 may include a special-purpose computing device or a general-purpose computing system. The controller 108 may be configured to process input received from the survey instrument 100, send instructions to the survey instrument 100, and to perform methods in accordance with embodiments of the present invention. The controller 108 may include one or more input devices (e.g., buttons, keypad, keyboard, touchscreen, mouse, and the like) and/or one or more output devices (e.g., display monitor, printer, and the like). The controller 108 will typically include one or more processors and non-transitory computer-readable storage media (e.g., magnetic storage, optical storage, solid-state storage, or the like).

In some embodiments, the controller 108 provides a user interface to the survey instrument 100 via the input and output devices. The user interface allows a user to a control operation of the survey instrument 100. A variety of user interfaces may be provided including graphical user interfaces that display one or more screens for providing output to a user and/or for receiving input from a user.

In some embodiments the user interface and/or functionality of the controller 108 may be provided remotely. Merely by way of example, the controller 108 and/or the survey instrument 100 may be configured to communicate with a separate computer (e.g., an office computer or computer system). In this scenario, at least a portion of the user interface and functionality provided by the controller 108 may be provided by the remote computer. The computer may serve to communicate instructions to the controller 108 and/or to receive data therefrom. Thus, it should be appreciated that the methods described herein could be implemented locally (e.g., in the field) using the controller 108, remotely (e.g., in an office) using a separate computer, or some combination thereof. In other embodiments, the user interface and functionality may be provided through a web site that may be displayed using a web browser running on the controller 108 and/or the computer.

A number of different configurations of the controller 108 are possible. In one embodiment, for example, the controller 108 may be permanently (or relatively permanently) mounted on the support pole 106. In another embodiment, the controller 108 may be formed integrally with the support pole 106. In yet other embodiments, the controller 108 may be removably mounted to the support pole 106 or physically separate from the support pole 106.

Figure 2A:
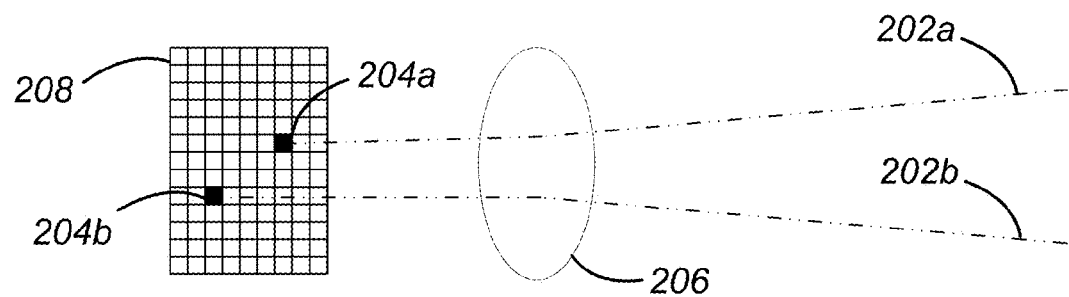
FIGS. 2A-2B are simplified diagrams showing various aspects of an exemplary image sensor.

The imaging device 104 may include any device (or set of devices) that is capable of capturing optical images. The imaging device 104 may include one or more digital cameras, digital video cameras, or the like. The imaging device 104 typically includes a lens that is used to provide light rays to a sensor array (e.g., and a CCD or CMOS optical sensor). The light rays are reflected off objects, surfaces, and points and that exist in a scene surrounding the imaging device 104 (or a portion of the scene within a field of view of the imaging device 104). The light rays pass through the lens and impinge on pixels (or discrete elements) of the array to form electrical signals that collectively provide image data (or an array of image data). This can be illustrated with reference to FIG. 2A, where light rays 202a, 202b pass through a lens 206 and impinge on pixels 204a, 204b of sensor array 208. As would be appreciated by one of ordinary skill in the art, a typical imaging device may include a sensor array with millions of pixels. Further, in reality the light rays are not discrete elements but instead are part of a continuum of rays emitted from objects in the scene within the field of view of the imaging device.

Figure 2B:
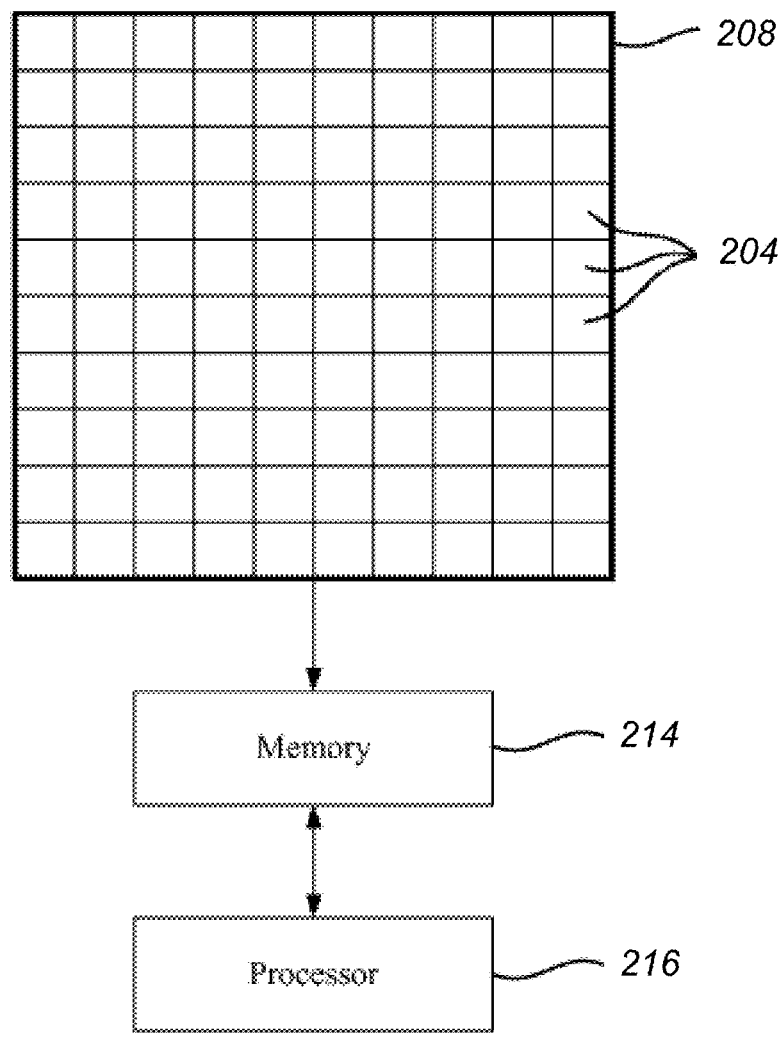

As illustrated in FIG. 2B, image data collected by pixels 204 of an image sensor 208 may be stored in memory 214 and/or provided to a processor 216 for processing. The memory 214 may be any type of conventional data storage (e.g., magnetic storage, optical storage, solid-state storage, or the like) configured to store the image data. The memory 214 may also store instructions that are used by the processor 216 to process the image data. It should be appreciated that the memory 214 and/or the processor 216 may be located locally within the imaging device 104 or remote from the imaging device 104 (e.g., within the controller 108 and/or within a remote computer).

The imaging device 104 may include a communication interface similar to that of the GNSS receiver 102 described above. Image data may be communicated to the controller 108 or another computer using the communication interface. The imaging device 104 may include any necessary hardware and software to store the captured image data (e.g., arrays of digital image data), process the captured image data, and/or transmit the captured image data to another device (such as the controller 108). The imaging device 104 may or may not have a separate display for viewing the image data.

In some embodiments, the imaging device 104 may include a plurality of imaging devices arranged to collectively capture a series of images providing a panoramic view of a scene surrounding the survey instrument 100. In some embodiments the panoramic view may include a full 360° view. In the example shown in FIG. 1A, the imaging device 104 includes a number of imaging devices arranged in a cluster about the support pole 106. The imaging devices may be arranged in a fixed relationship to each other (e.g., with a fixed angle between them) and configured to capture a continuous view of the scene almost simultaneously. This is in contrast to the example shown in FIG. 1B, where the imaging device 114 includes a single imaging device (or fewer imaging devices). In this embodiment, the imaging device 114 may be configured to rotate about the support pole 106 either continuously or in increments to provide a series of images capturing a continuous view of the scene. The GNSS receiver 102 and support pole 106 shown in this example may be configured in a manner similar to their corresponding components shown in FIG. 1A and described above.

Figure 3:
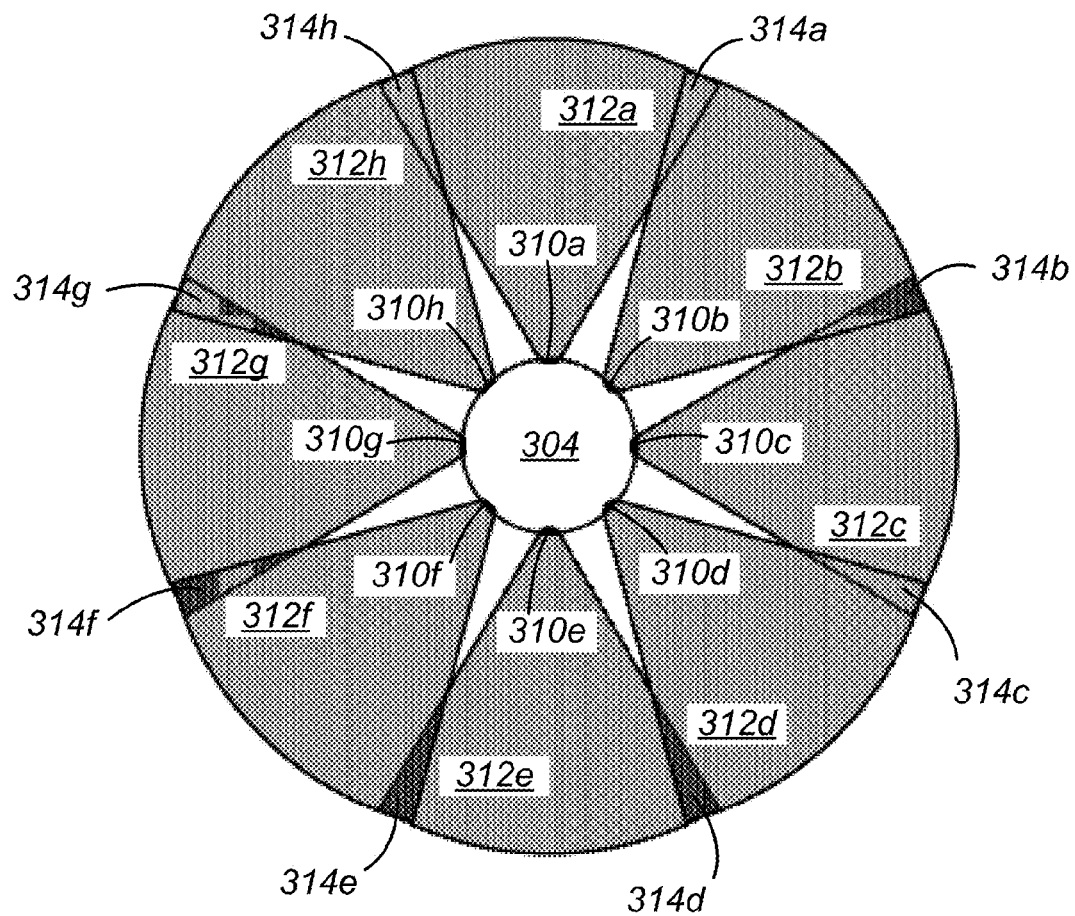
FIG. 3 is a simplified plan view of an imaging device that may be used in accordance with some embodiments of the invention.

FIG. 3 is a simplified plan view of an imaging device that may be used in accordance with some embodiments of the invention. The imaging device can be used to provide a series of images that can be displayed together to provide a continuous view of a scene. In this example, an imaging device 304 includes eight separate imaging devices 310a, 310b, 310c, 310d, 310e, 310f, 310g, 310h arranged about a circle and having fields of view 312a, 312b, 312c, 312d, 312e, 312f, 312g, 312h. The fields of view overlap providing overlapping portions 314a, 314b, 314c, 314d, 314e, 314f, 314g, 314h. It should be appreciated that this embodiment is provided merely as an example, and more or fewer imaging devices providing more or fewer fields of view may be used in accordance with embodiments of the invention. In an alternative embodiment, for example, the imaging device 304 could include fewer imaging devices that are configured to obtain images at positions of the imaging devices 310a, 310b, 310c, 310d, 310e, 310f, 310g, 310h shown in this example. Other embodiments may utilize an imaging device that provides a view encompassing less than the 360° view shown in this example. Further, in some embodiments, the imaging device 304 could include imaging devices arranged about both horizontal and vertical axis to expand coverage of the fields of view up to and including a complete spherical view.

Displaying Image Data

Figure 4A:
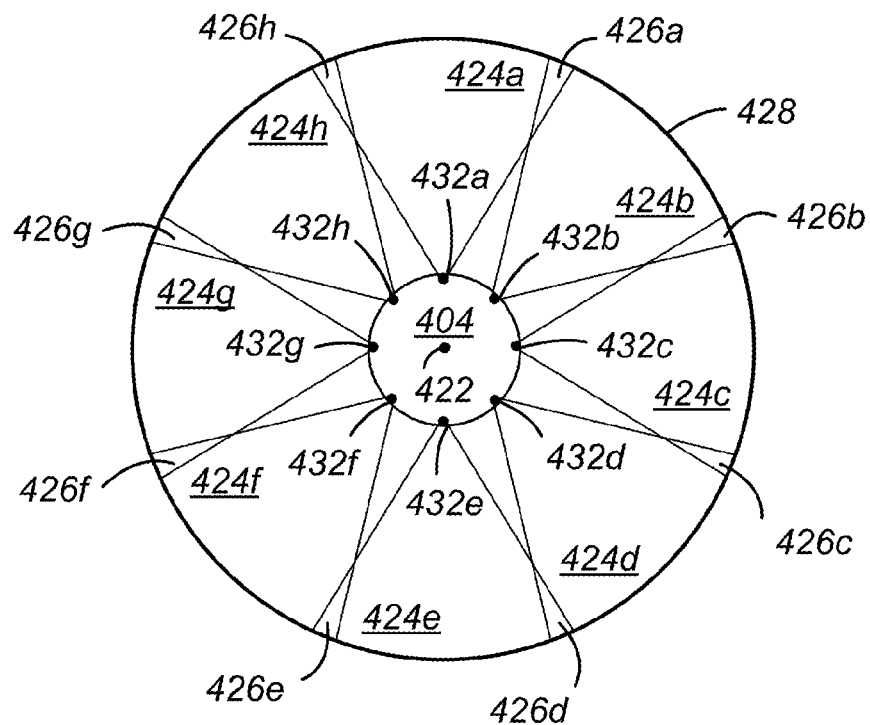
FIGS. 4A-4B and FIGS. 5A-5B are simplified diagrams illustrating image data projected onto surfaces in accordance with some embodiments of the invention.
Figure 4B:
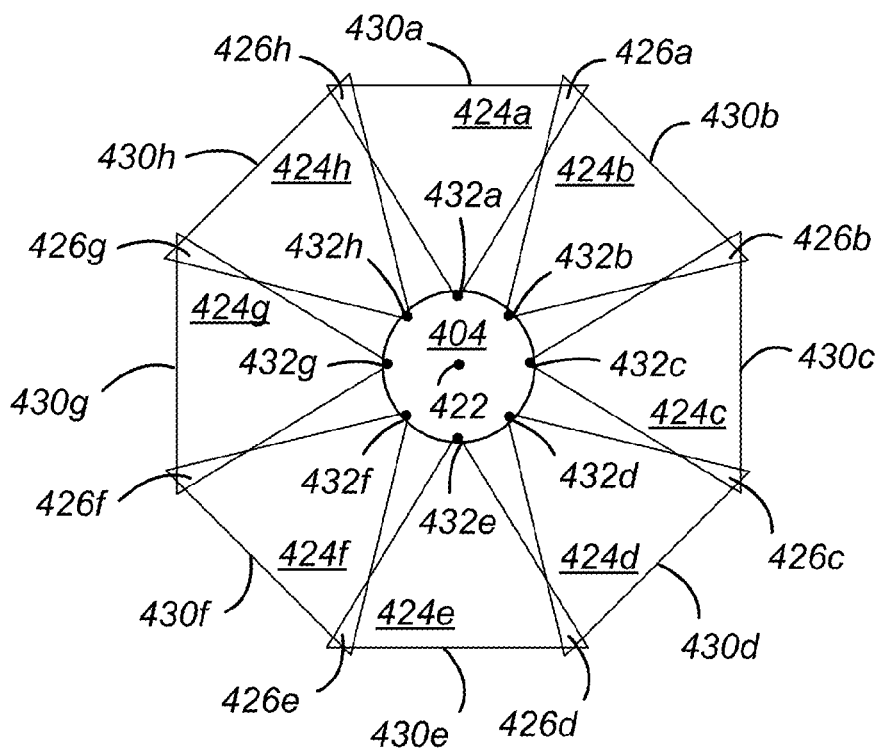

FIGS. 4A-4B are simplified diagrams showing image data projected onto surfaces in accordance with some embodiments of the invention. Each of these figures show image data 424a, 424b, 424c, 424d, 424e, 424f, 424g, 424h projected onto a surface 428 from a location 432a, 432b, 432c, 432d, 432e, 432f, 432g, 432h. The locations 432a, 432b, 432c, 432d, 432e, 432f, 432g, 432h are at substantially the same locations from which the image data 424a, 424b, 424c, 424d, 424e, 424f, 424g, 424h was obtained (the locations of the individual imaging devices). The image data 424a, 424b, 424c, 424d, 424e, 424f, 424g, 424h between adjacent images may overlap depending on a distance from the locations 432a, 432b, 432c, 432d, 432e, 432f, 432g, 432h to the surface 428 to provide overlapping regions 426a, 426b, 426c, 426d, 426e, 426f, 426g, 426h.

FIGS. 4A-4B also show a perspective center 422 near a center of imaging device 404. While the image data 424a, 424b, 424c, 424d, 424e, 424f, 424g, 424h is captured from different locations 432a, 432b, 432c, 432d, 432e, 432f, 432g, 432h, it is displayed on a display monitor from a perspective of a single location. This location is typically the perspective center 422 but, as explained below with regard to FIGS. 8A-8B and FIGS. 9A-9B, the image data may be displayed from other locations in certain situations. A location of the perspective center 422 is generally selected at an average of the locations 432a, 432b, 432c, 432d, 432e, 432f, 432g, 432h from which the imaging data is captured and at a center of curvature of surface 428 and surfaces 430a, 430b, 430c, 430d, 430e, 430f, 430g, 430h.

Note that the surfaces 428 and 430a, 430b, 430c, 430d, 430e, 430f, 430g, 430h shown in FIGS. 4A-4B are part of a plan view and the surfaces may extend in a third dimension to form spheres or cylinders. Imaging devices may also be arranged to capture image data about a horizontal axis to provide additional image data of the scene above and/or below the horizontal plane shown in these examples. It should be appreciated that the methods described below are equally applicable to image data captured of any view of a surrounding scene (including a complete spherical view).

It should be appreciated that the surface 428 illustrated in FIG. 4A and the surfaces 430a, 430b, 430c, 430d, 430e, 430f, 430g, 430h illustrated in FIG. 4B do not represent actual physical surfaces. Instead, these surfaces represent mathematical constructs upon which it is presumed the image data will be projected for purposes of determining nonlinear corrections for the image data (or parameters for nonlinear transformation of the image data). Further, the image data is not actually projected onto the surface 428 or the surfaces 430a, 430b, 430c, 430d, 430e, 430f, 430g, 430h when determining the nonlinear corrections or during transformation of the image data, but the image data is mathematically transformed as if it were to be projected onto these surfaces. This is in contrast to displaying the image data on a display monitor where transformed (or corrected) image data is displayed for viewing by a user.

The nonlinear corrections are parameters that are used to transform the image data. The image data is transformed from a two-dimensional array of image data collected by an image sensor to an array of corrected image data that can be provided to a graphics system for display on a display monitor. The graphics system may display the corrected image data in a perspective manner. The corrected image data can be used to provide images on a display monitor that have a high metric value. This means that relative sizes and positions of objects in a scene are substantially reproduced in the displayed image. Further, because angles between adjacent arrays of image data are known (or angles between the imaging devices use to obtain the image data are known), the arrays of adjacent image data (such as image data 424a and image data 424b shown in FIG. 4A) can be displayed as part of a continuous scene without using a feature matching algorithm to stitch the images (or distort the images) and without having a knowledge of the shapes of surfaces and/or objects in the scene.

The nonlinear corrections may be based on a difference between a location of an imaging device that is used to capture the image data and a location of a perspective center from which the image data will be displayed on a display monitor. In the examples shown in FIGS. 4A-4B, this difference can be seen as the difference between the locations 432a, 432b, 432c, 432d, 432e, 432f, 432g, 432h and the location of the perspective center 422. The nonlinear corrections may also be based on a shape of a surface onto which the image data is projected (e.g., the surface 428 or one of the surfaces 430a, 430b, 430c, 430d, 430e, 430f, 430g, 430h) and a distance from the surface to an imaging device used to capture the image data (or to a lens of the imaging device). The nonlinear corrections may also be based on other parameters such as internal calibration of the imaging device and/or distortions introduced by a lens of the imaging device.

A shape of the surface onto which the data is projected (e.g., the surface 428 or one of the surfaces 430a, 430b, 430c, 430d, 430e, 430f, 430g, 430h) may be determined based on the lens of the imaging device used to capture the image data. For example, image data captured by an imaging device using an conventional F-theta lens may be projected onto a concave-shaped surface such as the surface 428 illustrated in FIG. 4A. Image data captured by an imaging device using a conventional rectilinear lens may be projected onto a flat surface such as one of the surfaces 430a, 430b, 430c, 430d, 430e, 430f, 430g, 430h illustrated in FIG. 4B. Note that the flat surfaces illustrated in FIG. 4B are arranged to form a concave-shaped surface so that a distance from the perspective center 422b to each of the surfaces 430a, 430b, 430c, 430d, 430e, 430f, 430g, 430h is the same. Other surface shapes may be used for other lens types.

Figure 5A:
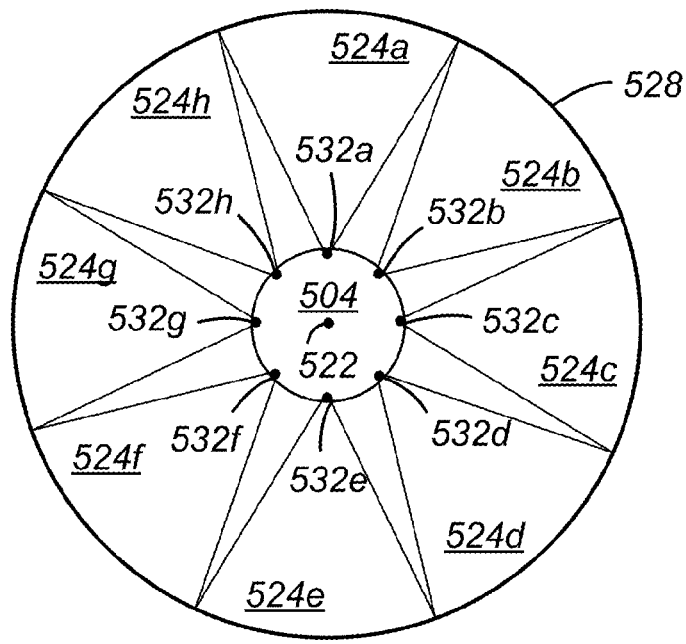
Figure 5B:
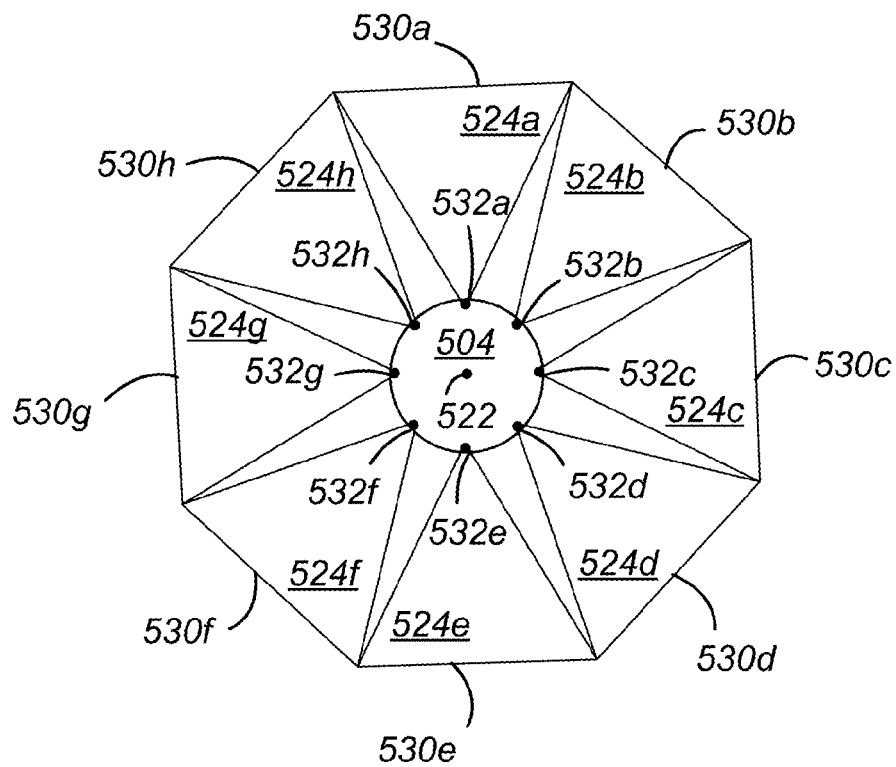

FIGS. 5A-5B are similar to FIGS. 4A-4B, except that image data 524a, 524b, 524c, 524d, 524d, 524e, 524f, 524g, 524h does not overlap. Because the embodiments described above do not rely on conventional feature matching algorithms, overlap between adjacent image data is not required to display the image data on a display monitor as a continuous image of a scene having a high metric value.

Figure 6:
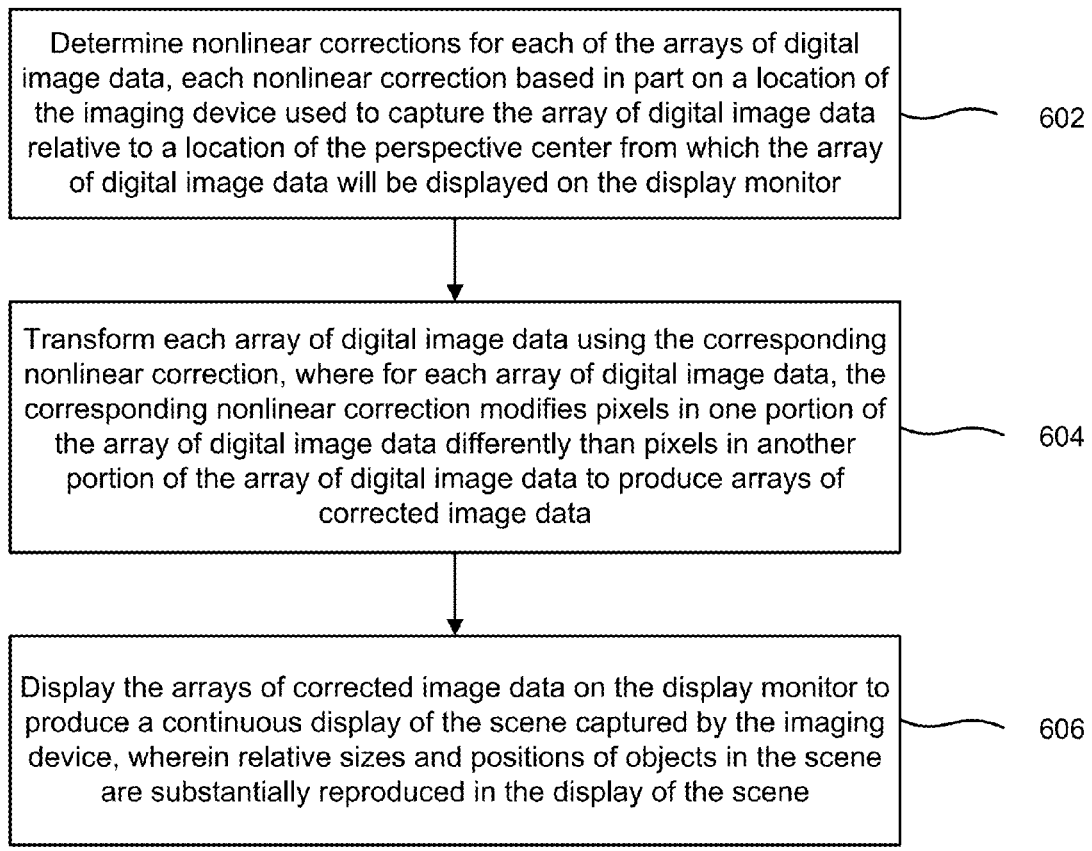
FIG. 6 is a flowchart illustrating a method for displaying arrays of digital image data on a display monitor in accordance with an embodiment of the invention.

FIG. 6 is a flowchart illustrating a method for displaying arrays of digital image data on a display monitor in accordance with an embodiment of the invention. The method includes determining nonlinear corrections for each of the arrays of digital image data, each nonlinear correction based in part on a location of the imaging device used to capture the array of digital image data relative to a location of the perspective center from which the array of digital image data will be displayed on the display monitor (602). The method also includes transforming each array of digital image data using the corresponding nonlinear correction, where for each array of digital image data, the corresponding nonlinear correction modifies pixels in one portion of the array of digital image data differently than pixels in another portion of the array of digital image data to produce arrays of corrected image data (604). The method also includes displaying the arrays of corrected image data on the display monitor to produce a continuous display of the scene captured by the imaging device, wherein relative sizes and positions of objects in the scene are substantially reproduced in the display of the scene (606).

It should be appreciated that the specific steps illustrated in FIG. 6 provide a particular method for displaying arrays of digital image data on a display monitor according to an embodiment of the present invention. Other sequences of steps may also be performed according to alternative embodiments. For example, alternative embodiments may perform the steps outlined above in a different order. Moreover, the individual steps illustrated in FIG. 6 may include multiple sub-steps that may be performed in various sequences. Furthermore, additional steps may be added or removed depending on the particular application.

Example of Determining Nonlinear Corrections for a Concave-Shaped Surface

The following example outline one method that may be used to determine nonlinear corrections for a concave-shaped (or spherical) surface. The surface referenced here is a projection surface (e.g., the surface 428 shown in FIG. 4A). Equations are derived to express an intersection of rays with the surface.

Note that in this example all object space entities are considered to be expressed in an arbitrary coordinate frame. This will typically be a world coordinate frame (e.g. a survey coordinate system) or perhaps an instrument coordinate frame.

A ray in space may be represented by a vector start point, s, and a unit magnitude direction vector, r. A point on the ray, x, at a distance $\lambda$ from the start point may be expressed by the vector equation:

$$x = s + \lambda r \qquad \text{Equation (1)}$$

If $0 < \lambda$, the point x is in front of the starting point s—i.e. it is visible to an imaging device that has an entrance pupil at location s. If $\lambda < 0$, the point x is behind the imaging device and is not visible in an image. In general, the direction vector, r, is assumed to have unit magnitude:

$$r^2 = 1 \qquad \text{Equation (2)}$$

so that the magnitude of the scalar, $\lambda$, represents the distance between s and x.

Consider the i-th imaging device within a survey instrument. Each pixel of an image sensor in this imaging device is associated with a geometric ray in space. Let $m_j$ represent the j-th pixel of interest (e.g. an image corner, a selected image location, or the like). Utilizing a combination of imaging device interior and exterior calibration parameters, this pixel location may be converted into a photogrammetric ray using the equation:

$$m_{ij} \rightarrow s_i + \lambda_{ij} r_{ij} \qquad \text{Equation (3)}$$

where $m_{ij}$ is the image sensor location (row, column) of the j-th point of interest measured in an image from the i-th imaging device;

$\rightarrow$ represents an application of optical and instrument calibration parameters to associate pixel location with geometric rays in space;

$s_i$ is the location of the entrance pupil of the imaging device expressed in the coordinate frame of interest;

$r_{ij}$ is the unit magnitude direction of the ray; and $\lambda_{ij}$ is an arbitrary distance along the ray.

Note that for a single measurement from a single image, the value of the distance parameter, $\lambda_{ij}$, is unknown and must be recovered from some other means (e.g. from another image captured from a different station, by intersection with some externally available or assumed surface, or another means).

A sphere may be represented by its vector center, c, and scalar radius, $\rho$. If a point, x, lies on a surface of the sphere, it satisfies the implicit equation:

$$(x-c)^2 - \rho^2 = 0 \qquad \text{Equation (4)}$$

Figure 7:
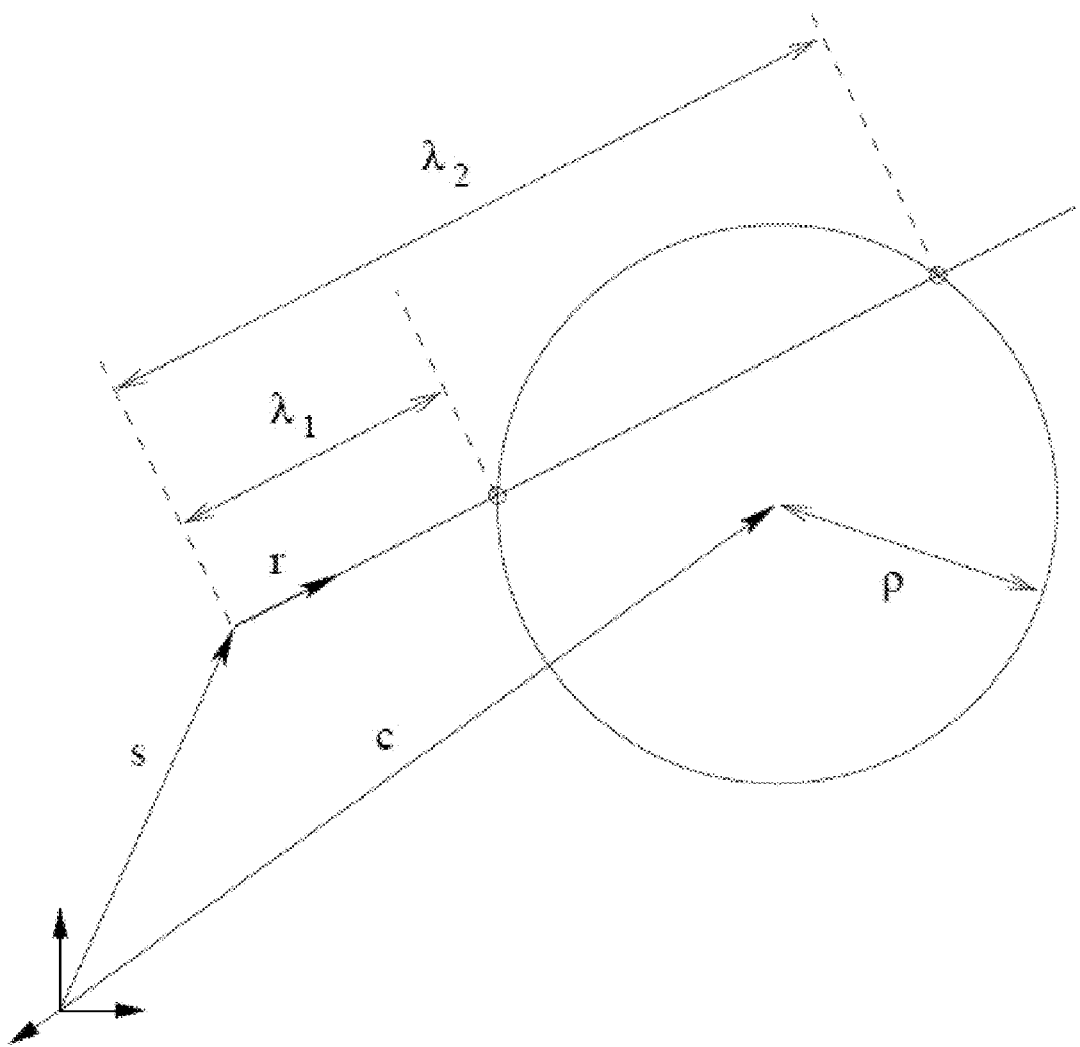
FIG. 7 is a simplified diagram illustrating some of the geometrical concepts that are involved in determining nonlinear corrections in accordance with an embodiment of the invention.

Intersection of a ray with a sphere is illustrated in FIG. 7. Locations at which the ray intersects the sphere can be computed by inserting Equation (1) into Equation (4). For convenience, the sphere equation can be expanded to obtain:

$$\begin{aligned} 0 &= (x-c)^2 - \rho^2 \\ &= x^2 - xc - cx + c^2 - \rho^2 \\ &= x^2 - 2x \cdot c + c^2 - \rho^2 \end{aligned} \qquad \text{Equation (5)}$$

Then squaring the ray equation gives:

$$\begin{aligned} x^2 &= (s - \lambda r)^2 \\ &= s^2 + \lambda(sr + rs) + \lambda^2 \\ &= s^2 + 2\lambda(s \cdot r) + \lambda^2 \end{aligned} \qquad \text{Equation (6)}$$

Note that the last term is obtained from the condition that $r^2 = 1$ such that $\lambda^2 r^2 = \lambda^2$. Substitution of the squared ray equation and the original into the expanded sphere equation yields:

$$0 = x^2 - xc - cx + c^2 - \rho^2 \quad\quad \text{Equation (7)}$$
$$= s^2 + 2\lambda(s \cdot r) + \lambda^2 - 2(s + \lambda r) \cdot c + c^2 - \rho^2$$

which may be rearranged as a classic quadratic equation:

$$0 = \lambda^2 + 2\lambda(s \cdot r - r \cdot c) + s^2 - 2s \cdot c + c^2 - \rho^2 \quad\quad \text{Equation (8)}$$
$$= \lambda^2 + 2\lambda[(s-c) \cdot r] + [(s-c)^2 - \rho^2]$$

For convenience, the following substitutions may be made:

$$\beta = (s-c) \cdot r \quad\quad \text{Equation (9)}$$

$$\gamma = (s-c)^2 - \rho^2 \quad\quad \text{Equation (10)}$$

such that the quadratic equation may be expressed as:

$$\lambda^2 + 2\beta\lambda + \gamma = 0 \quad\quad \text{Equation (11)}$$

which may be solved for the two roots of $\lambda$ as $$\lambda_\pm = -\beta \pm (\beta^2 - \gamma)^{1/2} \quad\quad \text{Equation (12)}$$

Corresponding vector point locations, $x_\pm$, may be determined as the solutions at distances $\lambda_\pm$ along the ray as shown by:

$$x_\pm = s + \lambda_\pm r \quad\quad \text{Equation (13)}$$

Note that the smallest positive root is the physically meaningful solution—i.e. is the point on the spherical surface that is visible in the image. If both $\lambda_\pm$ are positive this is the near face of the sphere. If both are negative the entire sphere is behind the imaging device. If the roots are identical and positive (or negative), then the ray is tangent to the sphere in front of (or behind) the imaging device. If the roots for $\lambda$ are imaginary, then the ray does not intersect the sphere.

As an example, consider the task of loading image textures into a graphics library. In this case, it is desirable to define a mesh of points that cover the image where each mesh element consists of a number of vertices (generally either 3 or 4). These detector locations are used to define corners of an image texture polygon—i.e. define which pixels are extracted from the image data file. The graphics library then "paints" this image texture polygon onto a "world polygon" that is expressed in the 3D graphics world frame. For texturing onto a spherical surface, the world polygon can be computed from the image detector mesh element corners as follows.

1. Define a sphere with center, c, near the center of the imaging device (e.g. use the instrument origin). Set the sphere radius, $\rho$, to a desired viewing distance.
2. Define a mesh (e.g. grid) of locations covering the detector for each imaging device.
3. For each mesh vertex, convert its pixel location into a ray including start point, s and direction, r.
4. Use c, $\rho$, s, and r to compute $\beta$ and $\gamma$ using Equation (10).
5. Compute the two roots of $\lambda$ using Equation (12). If the roots are real (i.e. if $0 < ((\beta^2 - \gamma))$, consider only roots with positive values and select the smallest one.
6. Compute a 3D world location, x, using the $\lambda$ solution value (if one is qualifies) in Equation (1).

Note that all the world solution points, x, lie on a sphere of radius $\rho$. As $\rho$ is changed, either the size of pixels on the sphere must change, or the number of pixels on the sphere must change. For some graphic applications and/or hardware, this may cause performance degradation.

An option is to renormalize the radius of the sphere before providing data to the graphics application. For example, if the texturing performance is reasonable for a sphere of radius $\rho_0$, then renormalize all world coordinates computed in step 6 above—i.e. via:

$$x' = \frac{\rho_0}{\rho} x \quad\quad \text{Equation (14)}$$

where, $\rho_0$ is the radius of good performance, and $\rho$ is the forward projection radius used to compute the value of $\lambda$ and hence x.

Note that for a sphere with a center near a middle of an imaging device, the separation of the ray start points and s the sphere center, (s−c) is generally significantly smaller in magnitude (order of 0.06 m) than the sphere radius, $\rho$ (often order of 1-10 m)—i.e. (s−c)<<$\rho$. In this case:

$$(\beta/\gamma) = [(s-c) \cdot r]/[(s-c)^2 - \rho^2] \cong [(s-c) \cdot r]/-\rho^2 \quad\quad \text{Equation (15)}$$

is a relatively small quantity compared to one (i.e. $\beta/\gamma << 1$). Under this condition, an approximate relationship between $\gamma$ and $\rho$ may be expressed as:

$$\gamma \cong -\rho^2 \quad\quad \text{Equation (16)}$$

such that the radical may be expressed approximately as:

$$(\beta^2 - \gamma)^{1/2} \cong (\beta^2 + \rho^2)^{1/2} \quad\quad \text{Equation (17)}$$

Note that if |s−c|<<$\rho$, also $\beta << \rho$ and $\beta^2 << \rho^2$. The radical can be written as:

$$(\beta^2 + \rho^2)^{1/2} = \rho[(\beta^2/\rho^2) + 1]^{1/2} \quad\quad \text{Equation (18)}$$

which may be expanded using a series approximation. For small $\epsilon << 1$, the Taylor series for the square root is $$(1 \pm \epsilon)^{1/2} \simeq 1 \pm 1/2\epsilon \mp 1/8\epsilon^2 \pm \ldots$$

Applying this to the radical and retaining terms of first order yields:

$$\rho[1 + (\beta^2/\rho^2)]^{1/2} \cong \rho[1 + \tfrac{1}{2}(\beta^2/\rho^2)] \quad\quad \text{Equation (19)}$$

The solution represented by Equation (12) may therefore be approximated as:

$$\lambda_\pm = -\beta \pm (\beta^2 - \gamma)^{1/2} \quad\quad \text{Equation (20)}$$
$$\simeq \pm \rho - \beta$$
$$\simeq \pm \rho - (s-c) \cdot r$$

Determining a Primary Image

Figure 8A:
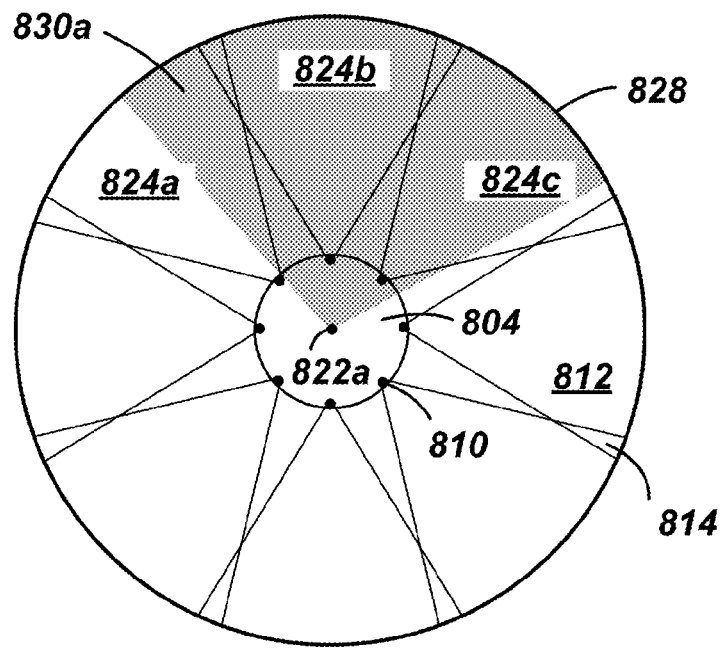
FIGS. 8A-8B are simplified plan views showing a series of overlapping image data and portions of the image data that are displayed on a display monitor in accordance with some embodiments of the invention.
Figure 8B:
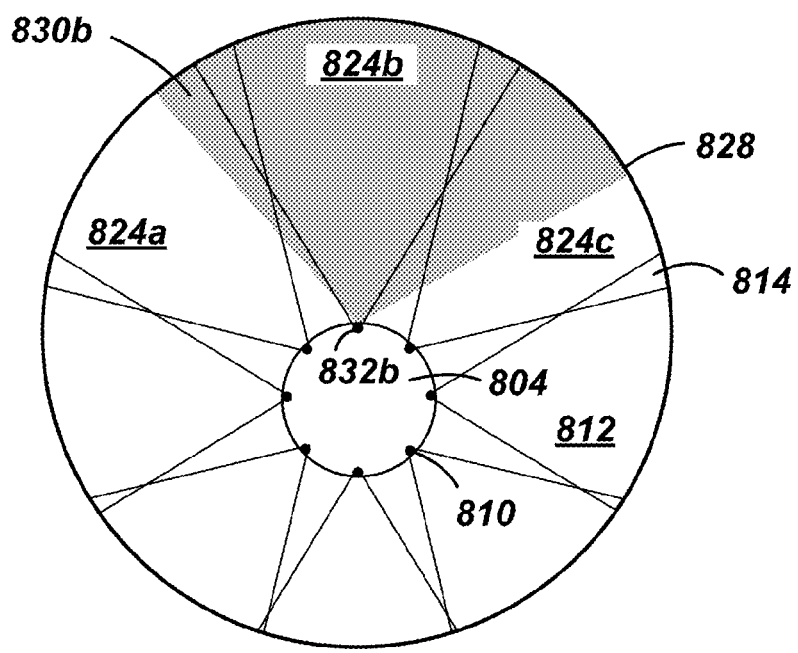

FIGS. 8A-8B are simplified plan views showing a series of overlapping image data and portions of the image data that are displayed on a display monitor in accordance with some embodiments of the invention. These figures combine some of the features shown in FIG. 3 and FIGS. 4A-4B that were described above. For example, FIGS. 8A-8B are similar to FIG. 3 in that they each show an imaging device 804 that includes a number of imaging devices 810 having fields of view 812 with overlapping portions 814. Note that each of the individual imaging devices 810, fields of view 812, and overlapping portions 814 are not separately identified in FIGS. 8A-8B to avoid excessive clutter. FIG. 8A is similar to FIG. 4A in that it shows a perspective center 822a from which image data is projected onto a viewing surface 828 for purposes of determining nonlinear corrections. Portions of the image data 824a, 824b, 824c overlap shaded regions 830a, 830b. The shaded regions 830a, 830b represent image data that forms a continuous display of a scene displayed on a display monitor or within a window on a display screen.

These figures show a change in a perspective center from which image data is displayed on a display monitor. In the example shown in FIG. 8A, portions of the image data 824a, 824b, 824c that overlap with the shaded region 830a are displayed on the display monitor from a perspective center 822a located approximately a center of the imaging device 804. In the example shown in FIG. 8B, portions of the image data 824a, 824b, 824c that overlap with the shaded region 830b are displayed on the display monitor from a perspective center 832b located approximately at a location of an imaging device that was used to capture the image data 824b. Thus, in going from FIG. 8A to FIG. 8B, the perspective centers from which image data is displayed on a display monitor shifts from the perspective center 822a to the perspective center 832b. Similarly, the surface 828 in FIG. 8B shifts and is centered around perspective center 832b.

Shifting perspective centers, as illustrated in these figures, may be used in a number of scenarios according to various embodiments of the invention. In one embodiment, the perspective center may be shifted from an average location of the imaging devices to a location of one of the imaging devices as a user zooms in on a particular portion of the image data. As an example, image data may be displayed from the perspective center 822a shown in FIG. 8A when the image data displayed on the display monitor is zoomed out and/or when the image data displayed on the display monitor overlaps with significant portions of the image data 824a, 824b, 824c (note that the shaded region 830a overlaps with all of the image data 824b and a large portion of the image data 824c). Image data may be displayed from the perspective center 832b shown in FIG. 8B when the image data on the display monitor is zoomed in and/or when the image data displayed on the display monitor overlaps primarily with one only one of the image data 824a, 824b, 824c (note that the shaded region 830b overlaps primarily with the image data 824b). In this case the image data to which the perspective center shifts may be considered the primary image and a stacking order may be arranged so that the primary image is on top. The primary image typically has the highest metric value since the perspective center from which it is displayed is substantially the same as the location from which the image data was acquired.

In some embodiments the primary image may change as a user pans around to different portions of a scene. In other embodiments, the primary image may change depending on which image data is displayed in a center of the display monitor (generally indicating an area interest to a user). In yet other embodiments, the primary image may be determined based on some combination of the above factors.

Figure 9:
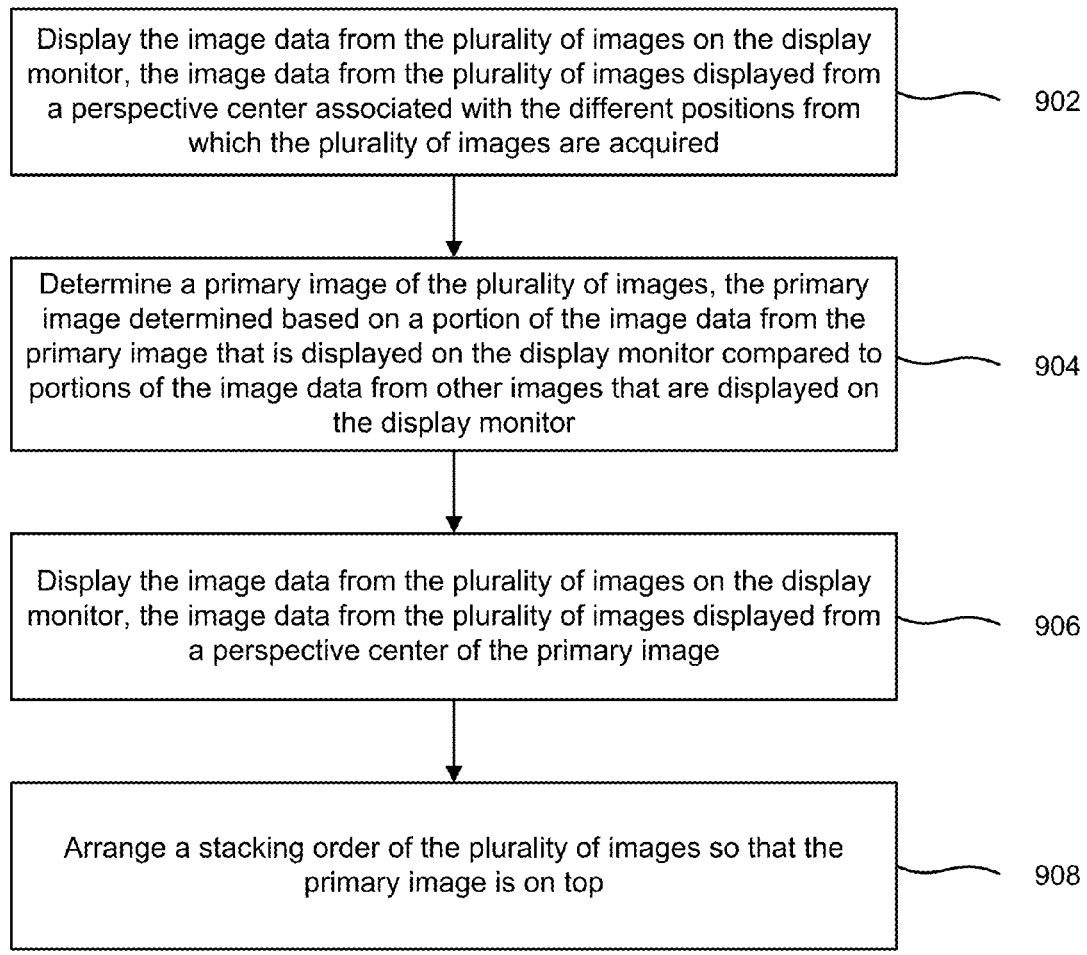
FIG. 9 is a flowchart illustrating a method for displaying image data from a plurality of images on a display monitor in accordance with an embodiment of the invention.

FIG. 9 is a flowchart illustrating a method for displaying image data from a plurality of images on a display monitor in accordance with an embodiment of the invention. The method includes displaying the image data from the plurality of images on the display monitor, the image data from the plurality of images displayed from a perspective center associated with the different locations from which the plurality of images are acquired (902). The method also includes determining a primary image of the plurality of images, the primary image determined based on a portion of the image data from the primary image that is displayed on the display monitor compared to portions of the image data from other images that are displayed on the display monitor (904). The method also includes displaying the image data from the plurality of images on the display monitor, the image data from the plurality of images displayed from a perspective center of the primary image (906). The method also includes arranging a stacking order of the plurality of images so that the primary image is on top (908).

It should be appreciated that the specific steps illustrated in FIG. 9 provide a particular method for displaying image data from a plurality of images according to an embodiment of the present invention. Other sequences of steps may also be performed according to alternative embodiments. For example, alternative embodiments may perform the steps outlined above in a different order. Moreover, the individual steps illustrated in FIG. 9 may include multiple sub-steps that may be performed in various sequences. Furthermore, additional steps may be added or removed depending on the particular application.

Pixel Selection

Figure 10:
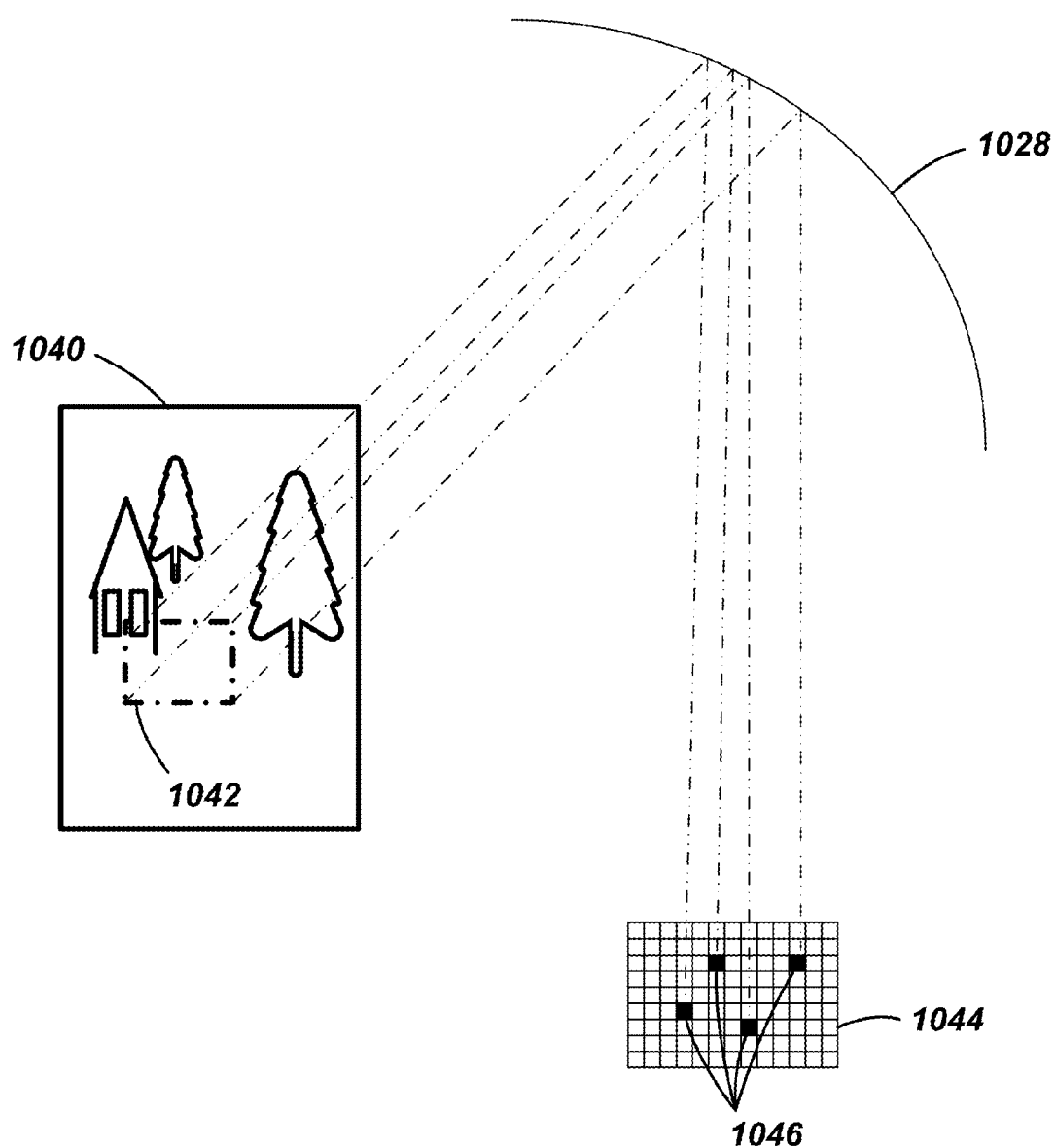
FIG. 10 is a simplified diagram showing pixels of a display monitor and corresponding pixels of image data on an image sensor in accordance with an embodiment of the invention.

FIG. 10 is a simplified diagram showing pixels of a display monitor and corresponding pixels of image data on an image sensor in accordance with an embodiment of the invention. In some embodiments it may be desirable to accurately select a point of interest in an image displayed on a display monitor. While image data displayed in accordance with some of the embodiments described above has a high metric value, small distortions may still exist in the displayed image data. For example, a graphics system typically introduces small distortions in transforming an array of image data to fit onto a display monitor. As a result, small differences may exist between a location of a point of interest as displayed on a display monitor and an actual location of the point in the real world as captured by the image sensor. To eliminate these small differences, some embodiments provide a means by which a point of interest can be selected based on the image data as captured by the image sensor.

This is illustrated with reference to FIG. 10, which shows a continuous scene of image data displayed on a display monitor 1040. A portion 1042 of the scene surrounding the point of interest is selected on the display monitor 1040. The portion 1042 of the scene may be selected or identified using any of a variety of techniques. For example, an area surrounding the point of interest may be selected using a drag box, selecting corner points, or the like.

Once an area has been selected, pixels of the display monitor along edges or corners of the area are identified along with their corresponding pixels of image data. One or more inverse transforms are performed to transform the pixels of image data to pixels of image data as captured by an image sensor. This is illustrated in FIG. 10 by dotted lines extending from corners of the portion 1042 of the scene surrounding the point of interest. The dotted lines extend to a concave-shaped surface 1028 (representing the transform applied to the image data using the nonlinear corrections as described above with regard to FIGS. 4A-4B, FIGS. 5A-5B, and FIG. 6), and from the concave-shaped surface 1028 to pixels 1046 of an image sensor 1044. In reality the dotted lines are not reflected back to the image sensor but instead provide a visual representation as the pixels of the display monitor are used to identify pixels of image data as captured by an image sensor 1044.

While small distortions may exist between the displayed image data and the image data as captured by the image sensor 1044, it is highly likely that the pixels identified on the image sensor 1044 will surround pixels representing the point of interest. Based on positions of the pixels of image data identified on the image sensor 1044, an area of the image sensor 1044 can be determined and the corresponding image data as captured by the image sensor 1044 can be displayed (without transformation) in a window (e.g., a pop up window) on the display monitor 1040. A user can then select the point of interest using the image data as captured by the image sensor 1044. In some embodiments the image data as captured by the image sensor 1044 can be magnified to provide further ease in identifying the point of interest.

Similar methods may be used in accordance with other embodiments. For example, in one embodiment the image data displayed on the display monitor 1040 may be downsampled to provide a low resolution image on the display monitor. It may not be possible to accurately identify a point of interest on the low resolution image. By selecting an area surrounding the point of interest, however, a corresponding area of the image data as captured by the image sensor 1044 can be identified and provided to a user in a window on the display monitor. The image data presented in the window may be provided in full resolution to allow accurate identification of the pixels associated with the point of interest.

Figure 11:
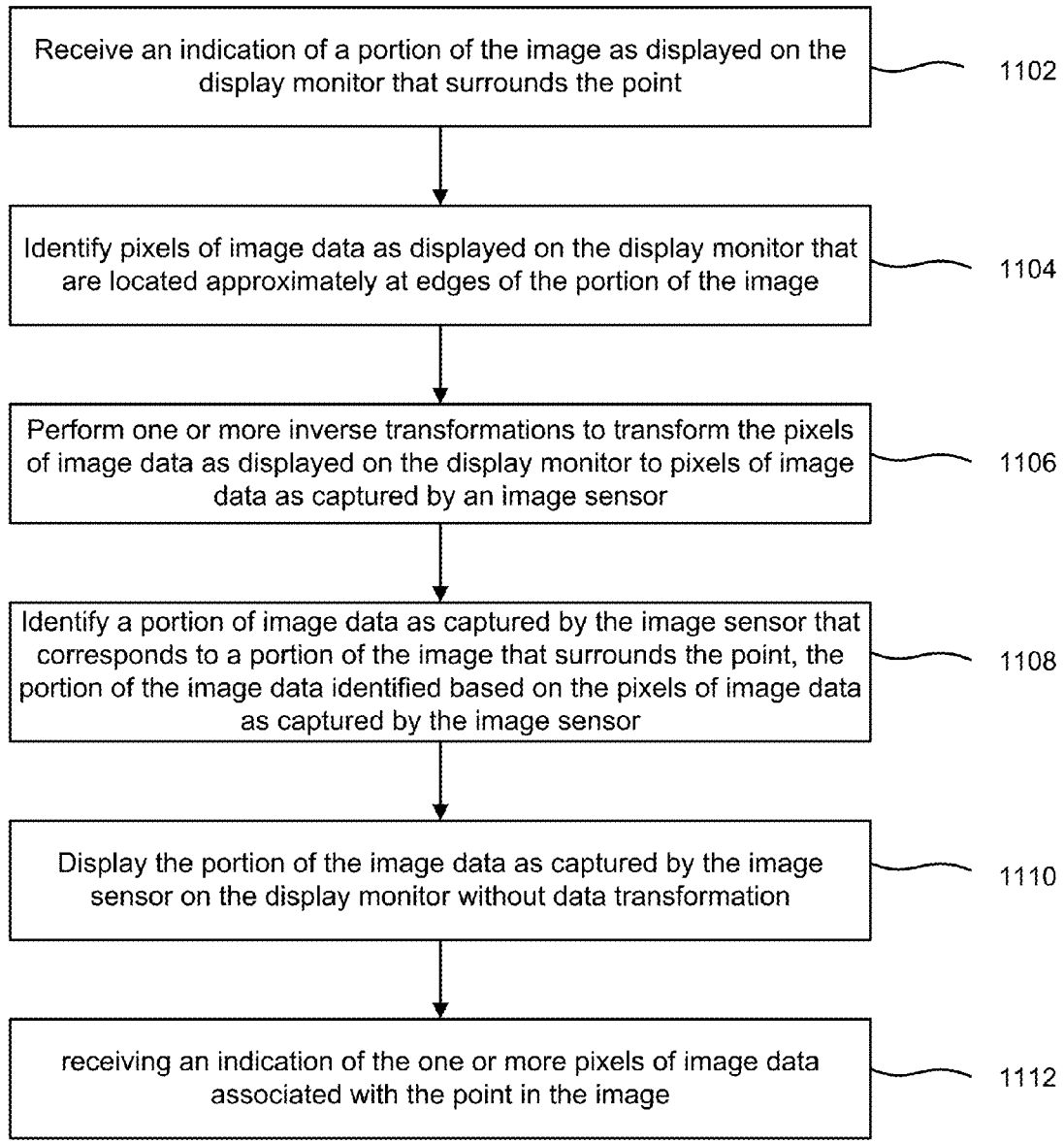
FIG. 11 is a flowchart illustrating a method for identifying one or more pixels of image data associated with a point in an image using a display monitor displaying the image in accordance with an embodiment of the invention.

FIG. 11 is a flowchart illustrating a method for identifying one or more pixels of image data associated with a point in an image using a display monitor displaying the image in accordance with an embodiment of the invention. The method includes receiving an indication of a portion of the image as displayed on the display monitor that surrounds the point (1102). The method also includes identifying pixels of image data as displayed on the display monitor that are located approximately at edges of the portion of the image (1104). The method also includes performing one or more inverse transformations to transform the pixels of image data as displayed on the display monitor to pixels of image data as captured by an image sensor (1106). The method also includes identifying a portion of image data as captured by the image sensor that corresponds to a portion of the image that surrounds the point, the portion of the image data identified based on the pixels of image data as captured by the image sensor (1108). The method also includes displaying the portion of the image data as captured by the image sensor on the display monitor without data transformation (1110). The method also includes receiving an indication of the one or more pixels of image data associated with the point in the image (1112).

It should be appreciated that the specific steps illustrated in FIG. 11 provide a particular method for identifying pixels of image data according to an embodiment of the present invention. Other sequences of steps may also be performed according to alternative embodiments. For example, alternative embodiments may perform the steps outlined above in a different order. Moreover, the individual steps illustrated in FIG. 11 may include multiple sub-steps that may be performed in various sequences. Furthermore, additional steps may be added or removed depending on the particular application.

Identifying a Point of Interest from Different Stations

Figure 12A:
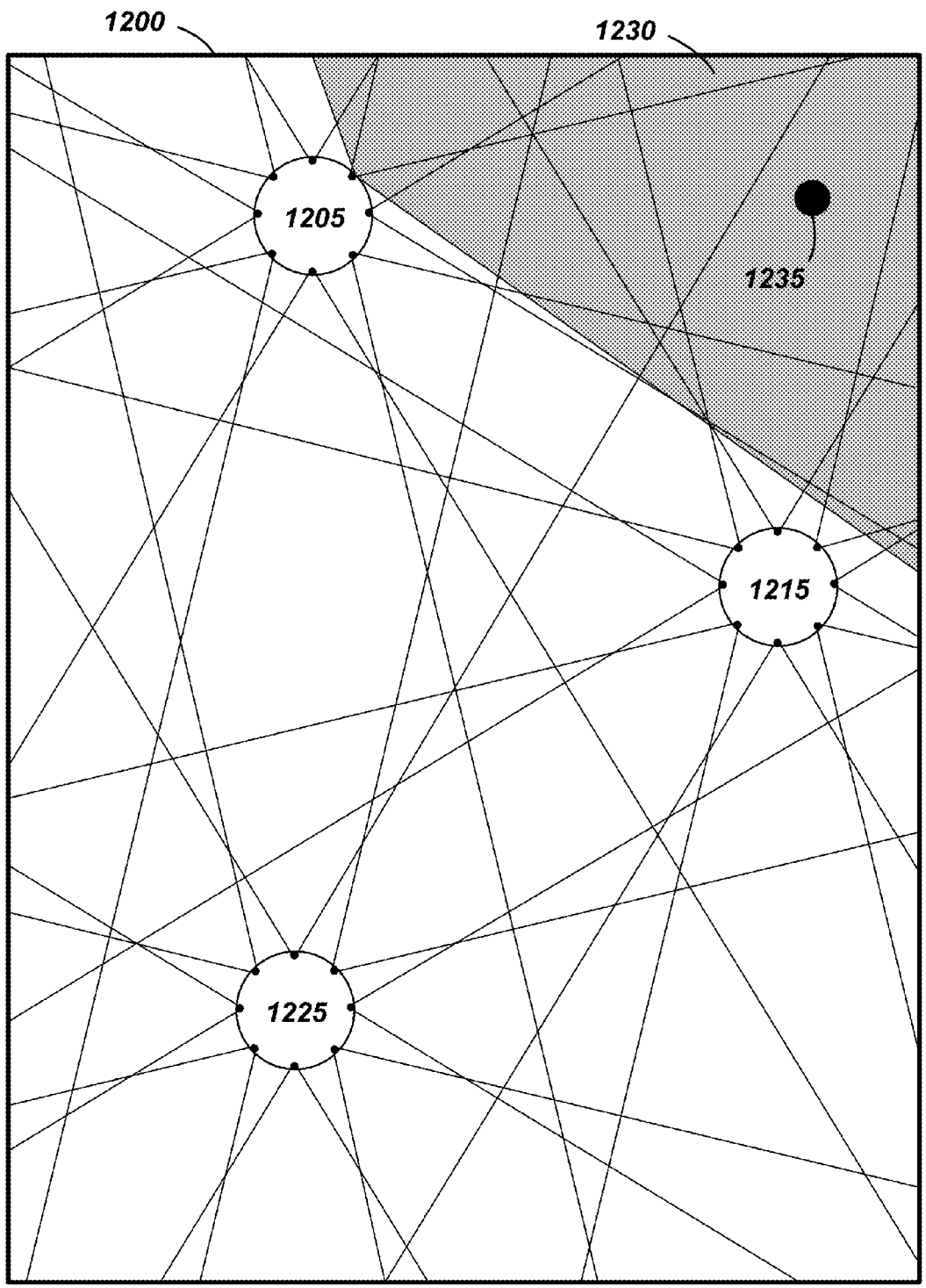
FIGS. 12A-12B are simplified diagrams showing imaging devices at different stations around a site and a point of interest that is captured in images from each of the stations in accordance with an embodiment of the invention.
Figure 12B:
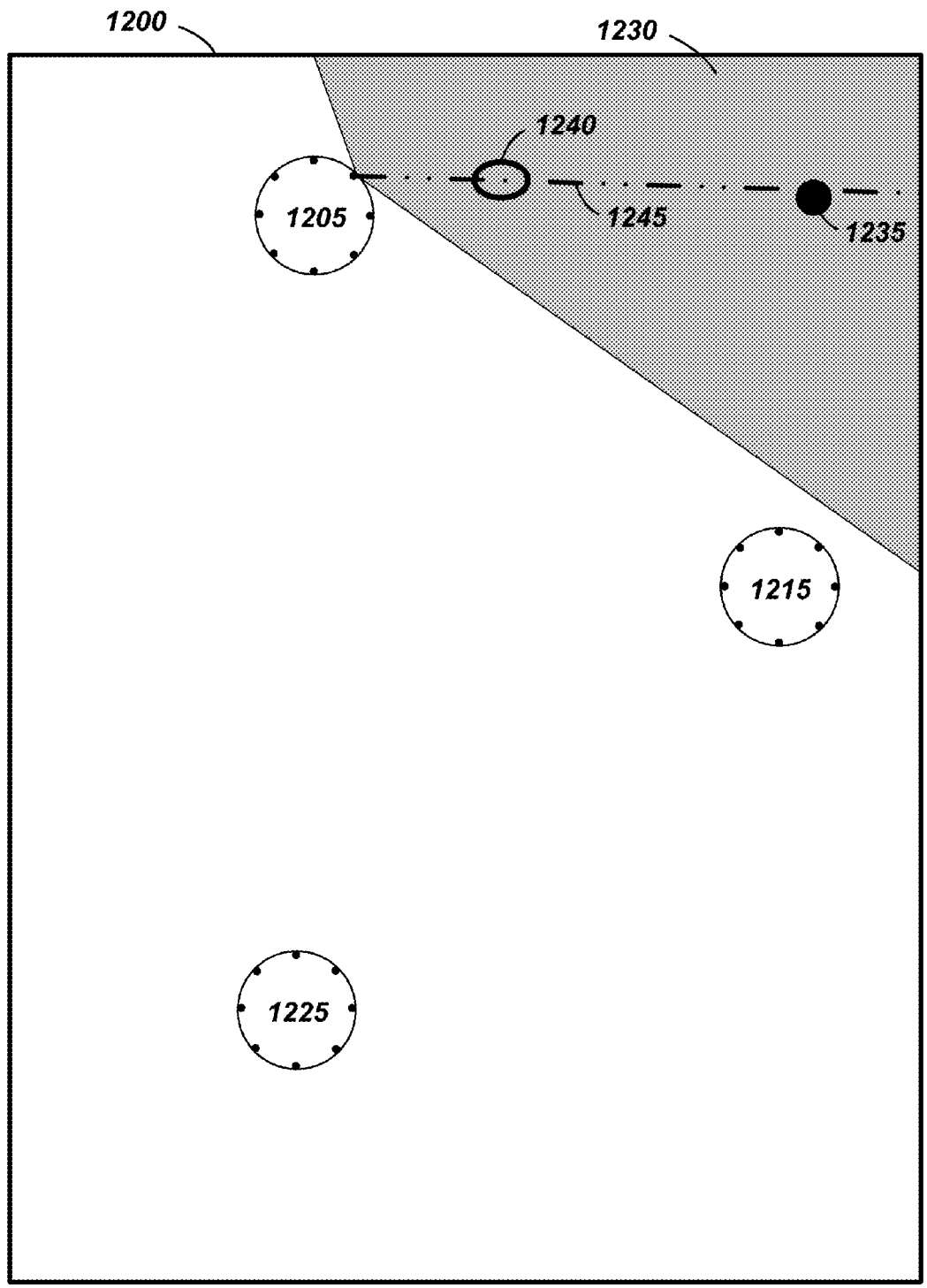

FIGS. 12A-12B are simplified diagrams showing imaging devices at different stations around a site and a point of interest that is captured in images from each of the stations in accordance with an embodiment of the invention. FIG. 12A shows a site 1200 that may be, for example, a construction site or a room. The outer line surrounding the site 1200 may correspond to a fence surrounding the construction site or physical walls bounding the room. Imaging devices 1205, 1215, 1225 are each at different locations (or stations) around the site 1200. Each imaging device 1205, 1215, 1225 includes a plurality of imaging devices arranged in a circle similar to the example shown in FIG. 3 and described above. Lines indicating a field of view of each imaging device within the site 1200 are shown. As can be seen, the entire site is within a field of view of at least one (and typically many) of the imaging devices.

FIG. 12A also shows a point of interest 1235 located in an upper corner of the site 1300, and a shaded region 1230 representing image data that forms a continuous display of a scene displayed on a display monitor or within a window on a display screen. The scene being displayed in this example is a portion of the site 1200. It should be appreciated that the scene may extend beyond the boundaries of the site 1200 and thus beyond the shaded region 1230 indicated in this example. The image data being displayed is captured using the imaging device 1205 (or imaging devices forming imaging device 1205). As shown by the shaded region 1230, the image data being displayed includes portions of image data from several of the imaging devices of the imaging device 1205. The image data is displayed from a perspective center located at the same location as one of the imaging devices, although this is not required. The image data may be displayed from a perspective center at any location.

It should be appreciated that views of other portions of the site 1200 that are obtained from the imaging devices 1215, 1225 located at different stations may also be displayed on the display monitor (e.g., in different windows). This provides a different view of the site 1200 from each of the different stations (or each of the imaging devices 1205, 1215, 1225). Corresponding shaded regions are not shown in FIG. 12A merely for ease of illustration.

The point of interest 1235 may be identified in any of the views from any of the imaging devices 1205, 1215, 1225 displayed on the display monitor. In this particular example, the point of interest 1235 is identified in the region 1230 that is displayed from imaging device 1205. In some situations, it may be desirable to locate the same point of interest 1235 in views from each of the other imaging devices 1215, 1225 as well (e.g., for position measurement using triangulation methods). Because each imaging device captures a 360° view of the site 1200, however, it may be time consuming to pan around until the point of interest 1235 is identified in views from each of the imaging devices. Additionally, the point of interest 1235 may simply be a point on the ground with no identifying features. In this case it may be difficult (if not impossible) to accurately select the point of interest 1235 in each of the views.

In accordance with an embodiment, a reference graphic (e.g., a line) may be superimposed over the point of interest 1235 to aid in identifying it in each of the views. Each of the views may be automatically oriented on the display monitor to show the reference graphic. As an example, in FIG. 12B a line 1245 is used as a reference graphic. A position and orientation of the line 1245 in the view represented by the shaded region 1230 may be determined by identifying pixels on an image sensor of the imaging device 1205 that correspond to the image data representing the point of interest 1235. A ray may be mathematically determined that extends from the pixels and passes through the point of interest 1235. The line 1245 may extend along this ray and be superimposed over the image data displayed on the display monitor.

The line 1245 may not be visible in the views on the display monitor from the imaging devices 1215, 1225, but once the position and orientation of the line 1245 is determined the views could be re-oriented if necessary such that the line 1245 is visible in each of the views. The line 1245 can be followed in each of the views and the point of interest 1235 can be located along the line 1245.

Some embodiments may also include a slidable indicator 1240 to aide in identifying the point of interest. The slidable indicator 1240 may be another reference graphic that is configured to be moved along the line 1245 with user input. In an embodiment, the slidable indicator 1240 may be movable from any of the views displayed on the display monitor (not just the view from imaging device 1205). In this case, the slidable indicator 1240 may be moved to the point of interest in whichever view the point of interest 1235 is most easily identified. In some embodiments, as the slidable indicator 1240 is moved along the line 1245 in one view, the other views displayed on the display monitor are automatically adjusted such that each of the views follow the movement of the slidable indicator 1240 along the line 1245. Further, each of the views may be automatically adjusted to a common zoom level that aides in following the slidable indicator.

Figure 13:
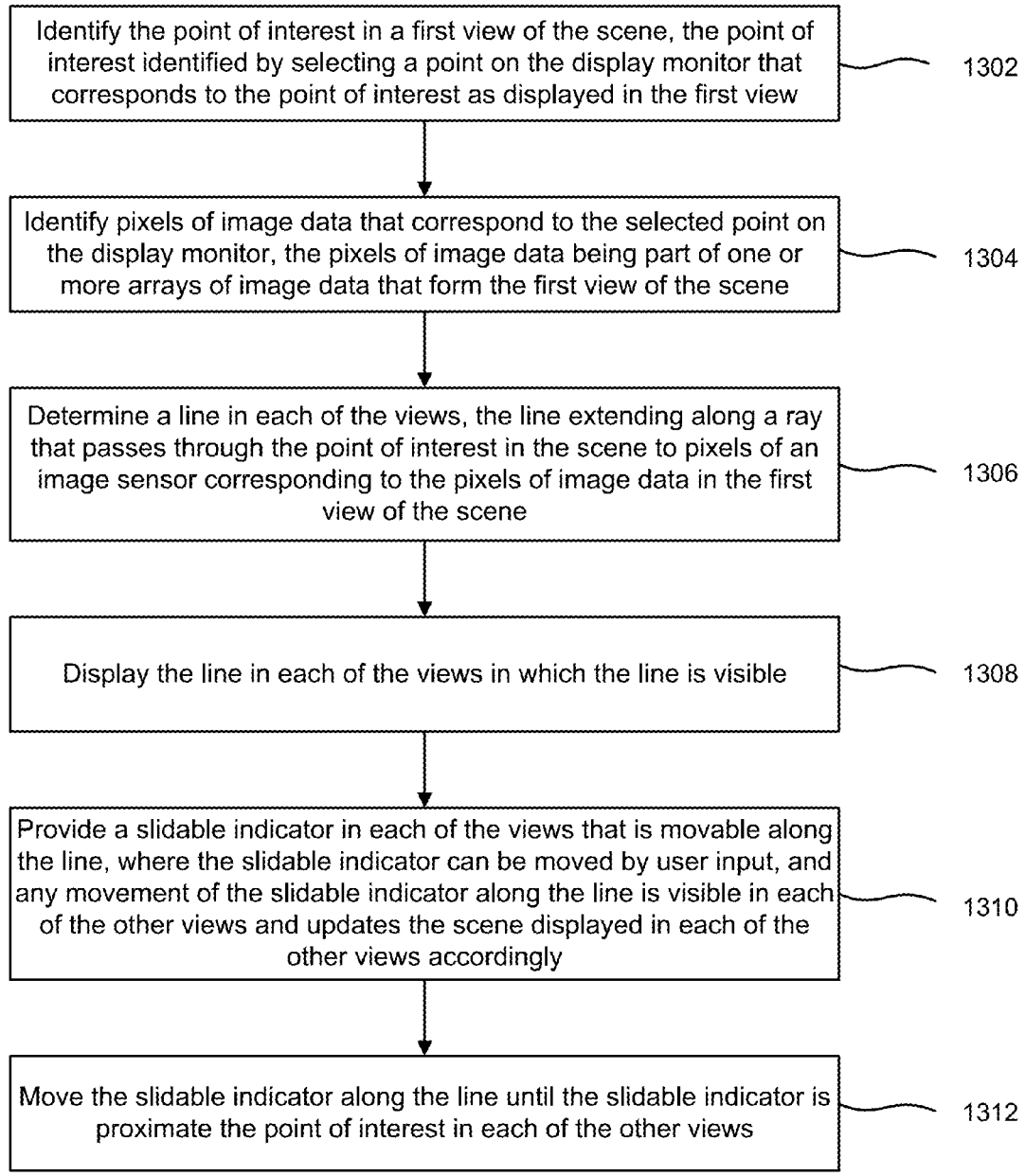
FIG. 13 is a flowchart illustrating a method for locating a point of interest in a plurality of images in accordance with an embodiment of the invention.

FIG. 13 is a flowchart illustrating a method for locating a point of interest in a plurality of images in accordance with an embodiment of the invention. The method includes identifying the point of interest in a first view of the scene, the point of interest identified by selecting a point on the display monitor that corresponds to the point of interest as displayed in the first view (1302). The method also includes identifying pixels of image data that correspond to the selected point on the display monitor, the pixels of image data being part of one or more arrays of image data that form the first view of the scene (1304). The method also includes determining a line in each of the views, the line extending along a ray that passes through the point of interest in the scene to pixels of an image sensor corresponding to the pixels of image data in the first view of the scene (1306). The method also includes displaying the line in each of the views in which the line is visible (1308). The method also includes providing a slidable indicator in each of the views that is movable along the line, where the slidable indicator can be moved by user input, and any movement of the slidable indicator along the line is visible in each of the other views and updates the scene displayed in each of the other views accordingly (1310). The method also includes moving the slidable indicator along the line until the slidable indicator is proximate the point of interest in each of the other views (1312).

It should be appreciated that the specific steps illustrated in FIG. 13 provide a particular method for locating a point of interest in a plurality of images according to an embodiment of the present invention. Other sequences of steps may also be performed according to alternative embodiments. For example, alternative embodiments may perform the steps outlined above in a different order. Moreover, the individual steps illustrated in FIG. 13 may include multiple sub-steps that may be performed in various sequences. Furthermore, additional steps may be added or removed depending on the particular application.

It should be appreciated that some embodiments of the present invention may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may be adapted to perform the necessary tasks. The term "computer-readable medium" includes, but is not limited to, portable or fixed storage devices, optical storage devices, wireless channels, sim cards, other smart cards, and various other non-transitory mediums capable of storing, containing, or carrying instructions or data.

While the present invention has been described in terms of specific embodiments, it should be apparent to those skilled in the art that the scope of the present invention is not limited to the embodiments described herein. For example, features of one or more embodiments of the invention may be combined with one or more features of other embodiments without departing from the scope of the invention. The specification and drawings are, accordingly, to be regarded in an illustrative rather than a restrictive sense. Thus, the scope of the present invention should be determined not with reference to the above description, but should be determined with reference to the appended claims along with their full scope of equivalents.

What is claimed is:

1. A method for displaying image data from a plurality of images on a display monitor, where at least some of the plurality of images are acquired from a plurality of imaging devices, the method comprising:
   displaying the image data from the plurality of images on the display monitor, the image data from the plurality of images displaying an image perceived from a perspective center associated with different locations, wherein each image of the plurality of images are captured by the plurality of imaging devices pointed radially outward from the perspective center, and wherein each imaging device of the plurality of imaging devices is in a fixed relationship to each other with a fixed angle between them, and wherein the displayed image comprises less than all images of the plurality of images captured by the plurality of imaging devices pointed radially outward from the perspective center;
   determining a primary image of the plurality of images, the primary image determined based on a portion of the image data from the primary image that is displayed on the display monitor compared to portions of the image data from other images that are displayed on the display monitor; thereafter
   displaying the image data from the plurality of images on the display monitor, the image data from the plurality of images displayed from a perspective center of the primary image; and
   arranging a stacking order of the plurality of images so that the primary image is on top.

2. The method of claim 1 wherein the plurality of images capture overlapping portions of a scene.

3. The method of claim 1 wherein the plurality of images capture adjacent portions of a scene.

4. The method of claim 1 wherein the perspective center associated with the different positions from which the plurality of images are acquired is located substantially at an average position of the different positions.

5. The method of claim 1 wherein the primary image is also determined based on a position of the primary image on the display monitor relative to positions of the other images displayed on the display monitor.

6. The method of claim 1 further comprising forming a line around the primary image as an indication of the primary image.

7. A display apparatus, comprising:
a display monitor configured to display image data from a plurality of images, where at least some of the plurality of images are acquired from a plurality of imaging devices;
one or more processors configured to:
  prior to a time T1,
    arrange the image data from the plurality of images for display on the display monitor, so that the image data from the plurality of images can display an image perceived from a perspective center associated with different locations, wherein each image of the plurality of images are captured by the plurality of imaging devices pointed radially outward from the perspective center, and wherein each imaging device of the plurality of imaging devices is in a fixed relationship to each other with a fixed angle between them, and wherein the displayed image comprises less than all images of the plurality of images captured by the plurality of imaging devices pointed radially outward from the perspective center; and
    determine a primary image of the plurality of images, the primary image determined based on a portion of the image data from the primary image that is displayed on the display monitor compared to portions of the image data from other images that are displayed on the display monitor;
  after the time T1,
    arrange the image data from the plurality of images for display on the display monitor, so that the image data from the plurality of images can be displayed from a perspective center of the primary image; and
    arrange a stacking order of the plurality of images so that the primary image is on top.

8. The display apparatus of claim 7 wherein the plurality of images capture overlapping portions of a scene.

9. The display apparatus of claim 7 wherein the plurality of images capture adjacent portions of a scene.

10. The display apparatus of claim 7 wherein the perspective center associated with the different positions from which the plurality of images are acquired is located substantially at an average position of the different positions.

11. The display apparatus of claim 7 wherein the primary image is also determined based on a position of the primary image on the display monitor relative to positions of the other images displayed on the display monitor.

12. The display apparatus of claim 7 wherein the processor is further configured to form a line around the primary image as an indication of the primary image.

* * * * *